US008787841B2

(12) United States Patent
Ketchum et al.

(10) Patent No.: US 8,787,841 B2
(45) Date of Patent: Jul. 22, 2014

(54) METHOD AND SYSTEM FOR PROVIDING BEAMFORMING FEEDBACK IN WIRELESS COMMUNICATION SYSTEMS

(75) Inventors: John W. Ketchum, Harvard, MA (US); Sanjiv Nanda, Ramona, CA (US); Arnaud Meylan, San Diego, CA (US); Shravan K. Surineni, Waltham, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1529 days.

(21) Appl. No.: 11/768,329

(22) Filed: Jun. 26, 2007

(65) Prior Publication Data

US 2007/0298742 A1 Dec. 27, 2007

Related U.S. Application Data

(60) Provisional application No. 60/816,988, filed on Jun. 27, 2006.

(51) Int. Cl.
| | |
|---|---|
| *H04B 1/00* | (2006.01) |
| *H04B 7/06* | (2006.01) |
| *H04L 25/03* | (2006.01) |
| *H04L 25/02* | (2006.01) |
| *H04B 7/04* | (2006.01) |

(52) U.S. Cl.
CPC .... *H04B 7/0643* (2013.01); *H04L 2025/03802* (2013.01); *H04B 7/0634* (2013.01); *H04L 25/0228* (2013.01); *H04B 7/0617* (2013.01); *H04L 2025/03426* (2013.01); *H04L 2025/03414* (2013.01); *H04B 7/0636* (2013.01); *H04B 7/0421* (2013.01); *H04L 25/03343* (2013.01); *H04L 25/0204* (2013.01)
USPC ............. 455/69; 370/328; 370/329; 370/338; 370/395.4; 455/63.4; 455/78; 455/101; 455/168.1

(58) Field of Classification Search
USPC .................. 455/41.2, 517, 403, 101
See application file for complete search history.

(56) References Cited

U.S. PATENT DOCUMENTS

| | | |
|---|---|---|
| 7,570,696 B2 | 8/2009 | Maltsev et al. |
| 7,693,228 B2 | 4/2010 | Aldana et al. |

(Continued)

FOREIGN PATENT DOCUMENTS

| | | |
|---|---|---|
| EP | 1396956 | 3/2004 |
| JP | 2005184730 A | 7/2005 |

(Continued)

OTHER PUBLICATIONS 802.11 Working Group: "IEEE 802.11N Part 11: Wireless LAN Medium Access Control (MAC) and Physical Layer (PHY) specifications: Enhancements for Higher Throughput" IEEE, Mar. 2006, XP002469313 cited in the application.

(Continued)

*Primary Examiner* — Dai A Phuong
(74) *Attorney, Agent, or Firm* — QUALCOMM IP Department; James Hunt Yancey, Jr.

(57) ABSTRACT

Techniques to support beamforming for stations in a wireless network are described. In one aspect, a station may support beamforming with implicit feedback or explicit feedback by having capabilities to transmit and receive sounding frames, respond to training request by sending a sounding frame, and respond to request for explicit feedback. In one design of explicit beamforming, the station may send a first frame with a request for explicit feedback and may also send a Null Data Packet (NDP) having at least one training field but no data field. The station may receive a second frame with the explicit feedback, which may be derived based on the NDP. The station may derive steering information (e.g., steering matrices) based on the explicit feedback and may then send a steered frame with beamforming based on the steering information. The station may also perform implicit beamforming using NDP for sounding.

50 Claims, 20 Drawing Sheets

(56) References Cited

U.S. PATENT DOCUMENTS

| | | | |
|---|---|---|---|
| 7,746,943 B2* | 6/2010 | Yamaura | 375/260 |
| 8,165,233 B2 | 4/2012 | Sondur | |
| 2003/0108117 A1 | 6/2003 | Ketchum et al. | |
| 2003/0161282 A1 | 8/2003 | Medvedev | |
| 2004/0005016 A1 | 1/2004 | Tewfik et al. | |
| 2004/0042439 A1 | 3/2004 | Menon | |
| 2004/0071222 A1 | 4/2004 | Liang et al. | |
| 2004/0087324 A1 | 5/2004 | Ketchum | |
| 2005/0135318 A1 | 6/2005 | Walton et al. | |
| 2005/0165946 A1 | 7/2005 | Stephens | |
| 2005/0286445 A1* | 12/2005 | Stephens | 370/278 |
| 2006/0098580 A1 | 5/2006 | Li et al. | |
| 2006/0104381 A1 | 5/2006 | Menon et al. | |
| 2006/0227733 A1* | 10/2006 | Frederiks et al. | 370/310 |
| 2006/0248429 A1* | 11/2006 | Grandhi et al. | 714/749 |
| 2006/0270343 A1* | 11/2006 | Cha et al. | 455/25 |
| 2007/0076805 A1 | 4/2007 | Kalluri et al. | |
| 2007/0129018 A1 | 6/2007 | Trainin et al. | |
| 2007/0171933 A1* | 7/2007 | Sammour et al. | 370/447 |
| 2007/0189412 A1* | 8/2007 | Xia et al. | 375/292 |
| 2007/0190942 A1* | 8/2007 | Wentink | 455/41.2 |
| 2007/0195811 A1* | 8/2007 | Basson et al. | 370/441 |
| 2007/0196072 A1 | 8/2007 | Zhou et al. | |
| 2007/0206504 A1* | 9/2007 | Koo et al. | 370/245 |
| 2007/0263746 A1 | 11/2007 | Son | |
| 2007/0281624 A1 | 12/2007 | Thomas et al. | |
| 2008/0247370 A1* | 10/2008 | Gu et al. | 370/338 |
| 2009/0290563 A1* | 11/2009 | Gu et al. | 370/338 |
| 2012/0127899 A1 | 5/2012 | Ketchum et al. | |
| 2013/0129000 A1 | 5/2013 | Fischer et al. | |

FOREIGN PATENT DOCUMENTS

| | | |
|---|---|---|
| JP | 2007089165 A | 4/2007 |
| JP | 2008538272 A | 10/2008 |
| JP | 2009526434 A | 7/2009 |
| RU | 2238611 C1 | 10/2004 |
| RU | 2003135853 | 4/2005 |
| WO | WO2004030249 A2 | 4/2004 |
| WO | WO2006020568 A1 | 2/2006 |
| WO | WO2006107886 A2 | 10/2006 |
| WO | WO2007114804 A1 | 10/2007 |

OTHER PUBLICATIONS

International Search Report—PCT/US07/072224, International Search Authority, European Patent Office—Mar. 17, 2008.

Stephens, et al., "Joint Proposal: High throuhgput extension to the 802.11 Standard: MAC", IEEE 802.11-05/1095r4, pp. 1-103, Jan. 13, 2005, Hawaii meeting, Jan. 2006, Hawaiii, USA.

Taiwanese Search report—096123294—TIPO—Sep. 1, 2010.

Written Opinion—PCT/US07/072224, International Search Authority, European Patent Office, Mar. 17, 2008.

* cited by examiner

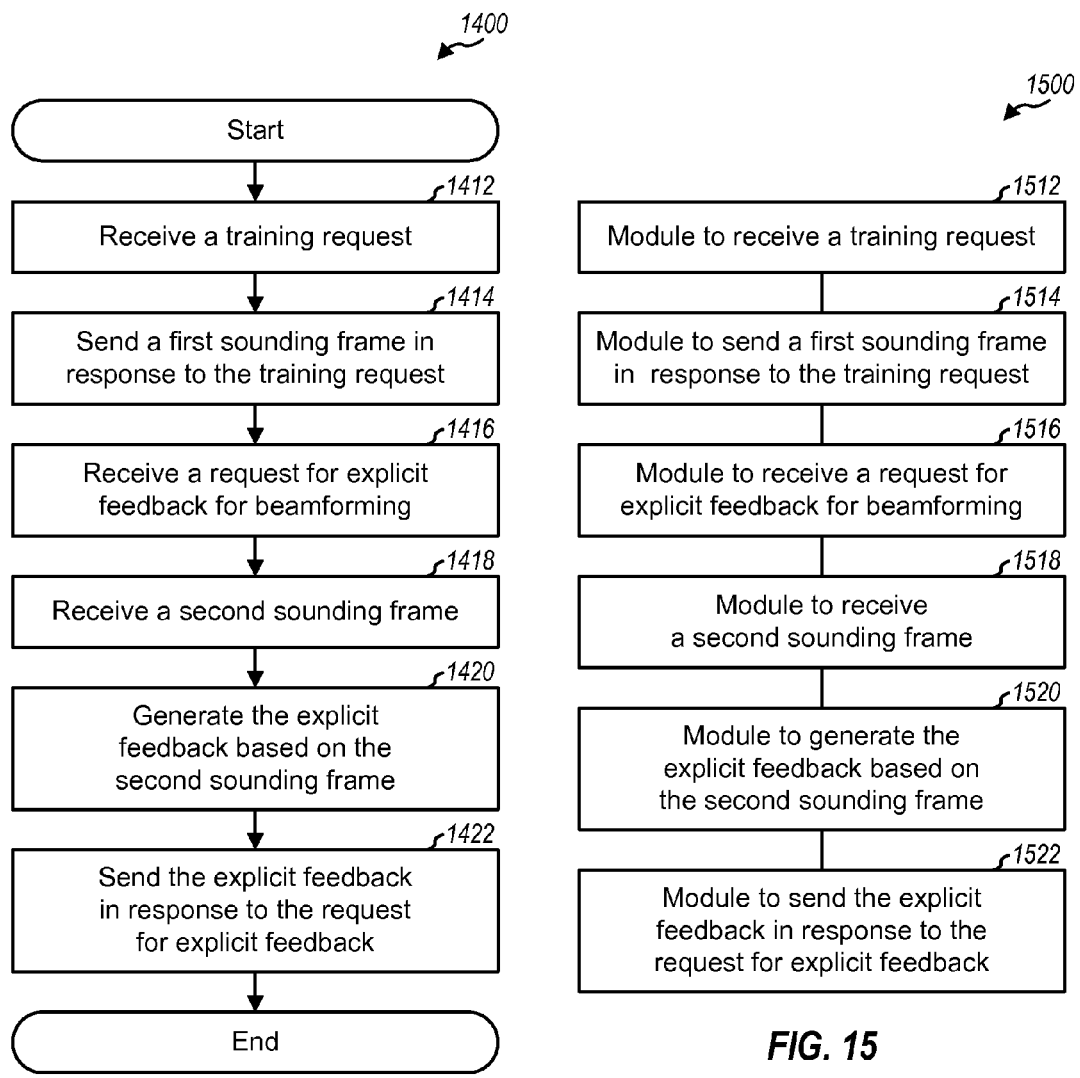

METHOD AND SYSTEM FOR PROVIDING BEAMFORMING FEEDBACK IN WIRELESS COMMUNICATION SYSTEMS

The present application claims priority to provisional U.S. Application Ser. No. 60/816,988, entitled "METHOD AND SYSTEM FOR PROVIDING BEAMFORMING FEEDBACK IN WIRELESS COMMUNICATION SYSTEMS," filed Jun. 27, 2006, assigned to the assignee hereof and incorporated herein by reference.

BACKGROUND

I. Field

The present disclosure relates generally to communication, and more specifically to techniques for sending feedback information for beamforming in wireless communication systems.

II. Background

In a wireless communication system, a transmitter may utilize multiple (T) transmit antennas for data transmission to a receiver equipped with multiple (R) receive antennas. The multiple transmit and receive antennas form a multiple-input multiple-output (MIMO) channel that may be used to increase throughput and/or improve reliability. For example, the transmitter may send up to T data streams simultaneously from the T transmit antennas to improve throughput. Alternatively, the transmitter may send a single data stream from all T transmit antennas to improve reception by the receiver.

Good performance (e.g., high throughput) may be achieved by transmitting one or more data streams with beamforming. To perform beamforming, the transmitter may obtain a channel estimate for the MIMO channel, derive steering matrices based on the channel estimate, and perform transmit spatial processing with the steering matrices. The transmitter may obtain the channel estimate in several manners depending on the duplexing scheme used by the system and the capabilities of the transmitter and receiver. It is desirable to support beamforming with as low complexity as possible for both the transmitter and receiver.

SUMMARY

Techniques to support beamforming for stations in a wireless communication network are described herein. In one aspect, a station may support beamforming with implicit feedback or explicit feedback by having capabilities to transmit and receive sounding frames, respond to training request by sending a sounding frame, and respond to request for explicit feedback. Implicit feedback and explicit feedback are two ways of obtaining information on a MIMO channel and are described below. The station would be able to perform implicit or explicit beamforming with another station having the same capabilities.

In another aspect, a station may perform beamforming with explicit feedback and Null Data Packet (NDP) sounding. The station may send a first frame with a request for explicit feedback and may also send an NDP having at least one training field but no data field. The station may receive a second frame with the explicit feedback, which may be derived based on the NDP. The station may derive steering information (e.g., steering matrices) based on the explicit feedback and may then send a steered frame with beamforming based on the steering information.

In yet another aspect, a station may perform beamforming with implicit feedback and NDP sounding. The station may send a first frame with a training request and may receive an NDP in response. The station may derive steering information based on the NDP and may then send a steered frame with beamforming based on the steering information.

In yet another aspect, a station may perform bidirectional beamforming with implicit feedback and NDP sounding. The station may send a first frame with a training request and may also send a first NDP either before or after the first frame. The station may receive a first steered frame with beamforming based on first steering information, which may be derived from the first NDP. The station may also receive a second NDP in response to the training request and may derive second steering information based on the second NDP. The station may then send a second steered frame with beamforming based on the second steering information.

The station may also perform beamforming with MPDU sounding, which uses frames having both training and data fields. Such a frame may carrying a Medium Access Control (MAC) protocol data unit (MPDU). Various aspects and features of the disclosure are described in further detail below.

BRIEF DESCRIPTION OF THE DRAWINGS

FIGS. 14 and 15 show beamforming by a station.

DETAILED DESCRIPTION

The techniques described herein may be used for various wireless communication networks and systems such as wireless local area networks (WLANs), wireless metropolitan area networks (WMANs), wireless wide area networks (WWANs), etc. The terms "networks" and "systems" are often used interchangeably. A WLAN may implement any of the radio technologies in the IEEE 802.11 family of standards, Hiperlan, etc. A WMAN may implement IEEE 802.16, etc. A WWAN may be a cellular network such as a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. For clarity, certain aspects of the techniques are described below for a WLAN that implements IEEE 802.11n.

IEEE 802.11n utilizes orthogonal frequency division multiplexing (OFDM), which is a modulation technique that partitions the system bandwidth into multiple (K) orthogonal subcarriers. For 20 MHz operation in IEEE 802.11n, K=64 total subcarriers are defined with OFDM and are assigned indices of −32 to +31. The 64 total subcarriers include 52 data subcarriers with indices of ±{1, . . . , 6, 8, . . . , 20, 22, . . . , 28} and four pilot subcarriers with indices of ±{7, 21}. The DC subcarrier with index of 0 and the remaining subcarriers are not used. For 40 MHz operation in IEEE 802.11n, K=128 total subcarriers with indices of −64 to +63 are defined and include 108 data subcarriers with indices of ±{2, . . . , 10, 12, . . . , 24, 26, . . . , 52, 54 . . . , 58} and six pilot subcarriers with indices of ±{11, 25, 54}. IEEE 802.11n also supports MIMO transmission from multiple transmit antennas to multiple receive antennas. IEEE 802.11n is described in IEEE P802.11n™/D1.0, entitled "Part 11: Wireless LAN Medium Access Control (MAC) and Physical Layer (PHY) specifications: Enhancements for Higher Throughput," dated March 2006, and in IEEE P802.11n™/D2.00, entitled "Part 11: Wireless LAN Medium Access Control (MAC) and Physical Layer (PHY) specifications: Amendment: Enhancements for Higher Throughput," dated February 2007.

Figure 1:
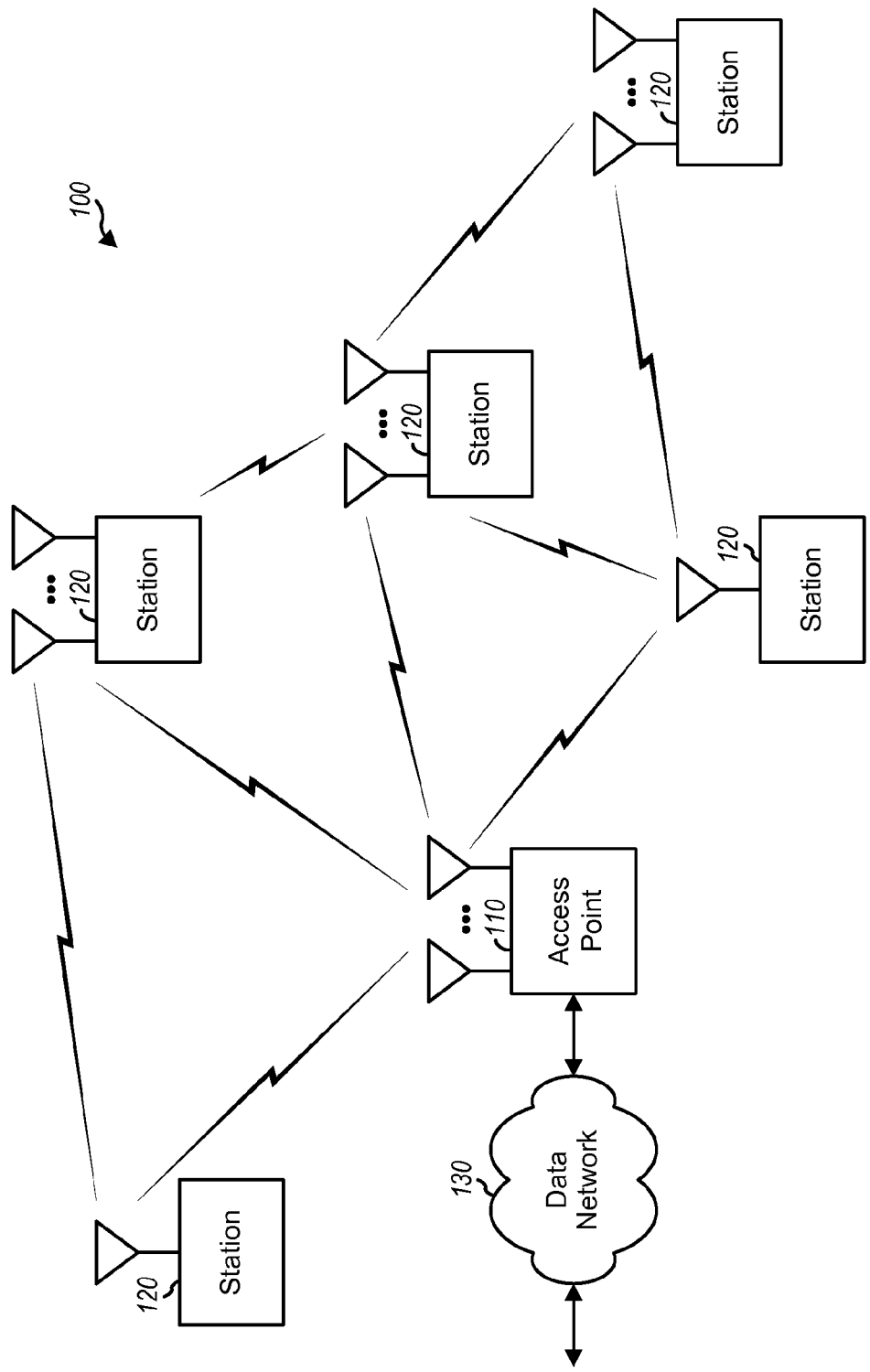
FIG. 1 shows a wireless communication network.

FIG. 1 shows a wireless network 100 with an access point 110 and multiple stations 120. In general, a wireless network may include any number of access points and any number of stations. A station is a device that can communicate with another station via a wireless medium/channel. A station may also be called, and may contain some or all of the functionality of, a terminal, a mobile station, a user equipment, a subscriber unit, etc. A station may be a cellular phone, a handheld device, a wireless device, a personal digital assistant (PDA), a laptop computer, a wireless modem, a cordless phone, etc. An access point is a station that provides access to distribution services via the wireless medium for stations associated with that access point. An access point may also be called, and may contain some or all of the functionality of, a base station, a base transceiver station (BTS), a Node B, etc. Stations 120 may communicate with access point 110 and/or with one another via peer-to-peer communication. Access point 110 may couple to a data network 130 and may communicate with other devices via the data network. Data network 130 may be the Internet, an intranet, and/or any other wired or unwired network.

The techniques described herein may be used for MIMO transmission on the downlink, the uplink, and peer-to-peer. For the downlink, access point 110 may be a transmitter, and stations 120 may be receivers. For the uplink, stations 120 may be transmitters, and access point 110 may be a receiver. For peer-to-peer, one of stations 120 may be a transmitter, and another one of stations 120 may be a receiver.

A MIMO channel formed by multiple (T) transmit antennas at a transmitter and multiple (R) receive antennas at a receiver may be characterized by an R×T channel matrix $H_k$ for each subcarrier k or each group of subcarriers of interest. Channel matrix $H_k$ may be diagonalized by performing eigenvalue decomposition of a correlation matrix of $H_k$, as follows:

$$R_k = H_k^H H_k = V_k \Lambda_k V_k^H, \quad \text{Eq (1)}$$

where $R_k$ is a T×T correlation matrix of $H_k$, $V_k$ is a T×T unitary matrix whose columns are eigenvectors of $R_k$, $\Lambda_k$ is a T×T diagonal matrix of eigenvalues of $R_k$, and "$H$" denotes a conjugate transpose.

Unitary matrix $V_k$ is characterized by the property $V_k^H V_k = I$, where I is the identity matrix. The columns of a unitary matrix are orthogonal to one another, and each column has unit power. $V_k$ is also referred to as a beamforming matrix. Diagonal matrix $\Lambda_k$ contains possible non-zero values along the diagonal and zeros elsewhere. The diagonal elements of $\Lambda_k$ are eigenvalues representing the power gains of the eigenmodes of $R_k$.

The transmitter (or beamformer) may perform transmit spatial processing for beamforming to the receiver (or beamformee), as follows:

$$z_k = Q_k x_k, \quad \text{Eq (2)}$$

where $x_k$ is a vector with up to T data symbols to be sent on subcarrier k, $Q_k$ is a steering matrix for subcarrier k, which may be derived based on $V_k$, and $z_k$ is a vector with T output symbols for the T transmit antennas on subcarrier k.

The beamforming in equation (2) steers or shapes the beams sent from the transmitter to the receiver. For effective beamforming, the transmitter should have an accurate estimate of the response of the MIMO channel from the transmitter to the receiver. This information on the MIMO channel may be used to derive appropriate steering matrices for transmit spatial processing to direct the beams from the transmitter toward the receiver.

Beamforming may be performed in several manners and may be supported with various protocol data units (PDUs). For clarity, beamforming using PDUs defined in IEEE 802.11n is described below.

In IEEE 802.11n, a MAC protocol processes data as MAC PDUs (MPDUs). A Physical Layer Convergence Protocol (PLCP) then processes the MPDUs to generate PLCP PDUs (PPDUs). A PPDU may also be referred to as a packet, a frame, etc. A physical layer (PHY) then processes and transmits each PPDU via the wireless medium. In IEEE 802.11n, a high-throughput PPDU (HT-PPDU) may be used for MIMO transmission from multiple transmit antennas to multiple receive antennas.

Figure 2:
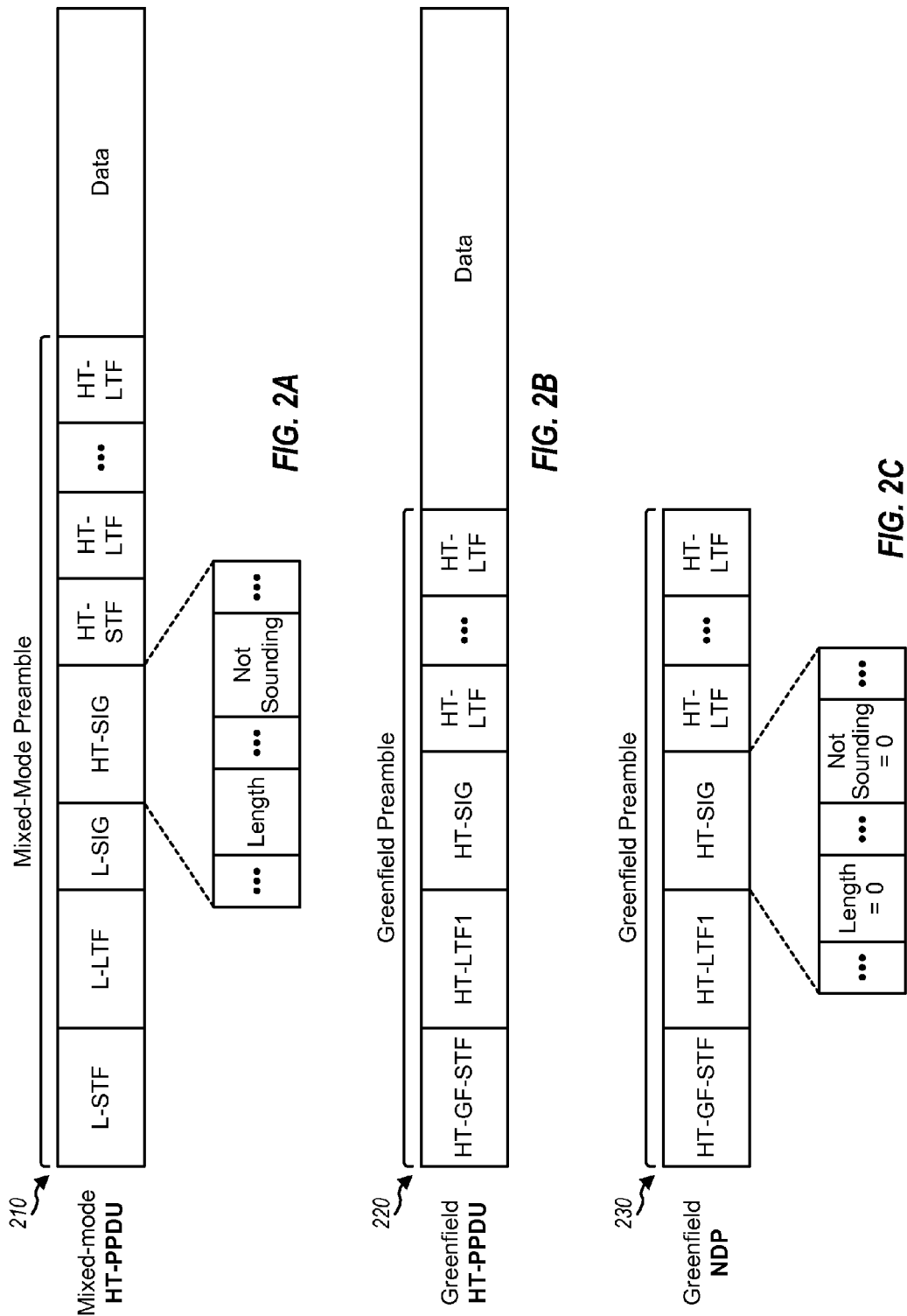
FIGS. 2A, 2B, and 2C show three PPDU formats in IEEE 802.11n.

FIG. 2A shows a structure of an HT-PPDU 210 with an HT mixed format in IEEE 802.11n. HT-PPDU 210 includes a mixed-mode preamble followed by a Data field. The mixed-mode preamble includes (i) a legacy preamble composed of a legacy short training field (L-STF) and a legacy long training field (L-LTF), (ii) a legacy signal (L-SIG) field, (iii) an HT signal (HT-SIG) field, and (iv) an HT preamble composed of an HT short training field (HT-STF) and one or more HT long training fields (HT-LTFs). The number of HT-LTFs is equal to or greater than the number of streams being sent simultaneously. The long and short training fields carry known training symbols that may be used for frame detection, time acquisition, frequency estimation and correction, automatic gain control (AGC), channel estimation, etc. The L-SIG and HT-SIG fields carry signaling information for the HT-PPDU. For example, the HT-SIG field carries (i) a Length field that indicates the length of the Data field and (ii) a Not Sounding field that indicates whether or not the HT-PPDU is a sounding PPDU. A sounding PPDU is a PPDU carrying known training symbols that may be used for channel estimation. The Data field carries the payload of the HT-PPDU, which may be one or more MPDUs, and has a variable length indicated by the Length field.

FIG. 2B shows a structure of an HT-PPDU 220 with an HT greenfield format in IEEE 802.11n. HT-PPDU 220 includes a greenfield preamble followed by a Data field. The greenfield preamble includes an HT greenfield short training field (HT-GF-STF), an HT long training field (HT-LTF1), an HT-SIG field, and one or more HT-LTFs.

HT-PPDUs 210 and 220 may be used as sounding PPDUs by setting the Not Sounding field to 0 and including a sufficient number of HT-LTFs. A sounding PPDU that carries data is referred to as a sounding MPDU.

FIG. 2C shows a structure of a Null Data Packet (NDP) 230 with a greenfield preamble in IEEE 802.11n. NDP 230 is a sounding PPDU that carries no data and may also be referred to as a Zero Length Frame (ZLF), etc. NDP 230 may be formed by setting the Length field to 0, setting the Not Sounding field to 0, including a sufficient number of HT-LTFs, and omitting the Data field.

HT-PPDUs 210, 220 and 230 are some PPDU formats supported by IEEE 802.11n. The PPDU formats supported by IEEE 802.11n are described in the aforementioned IEEE 802.11n documents.

Figure 3:
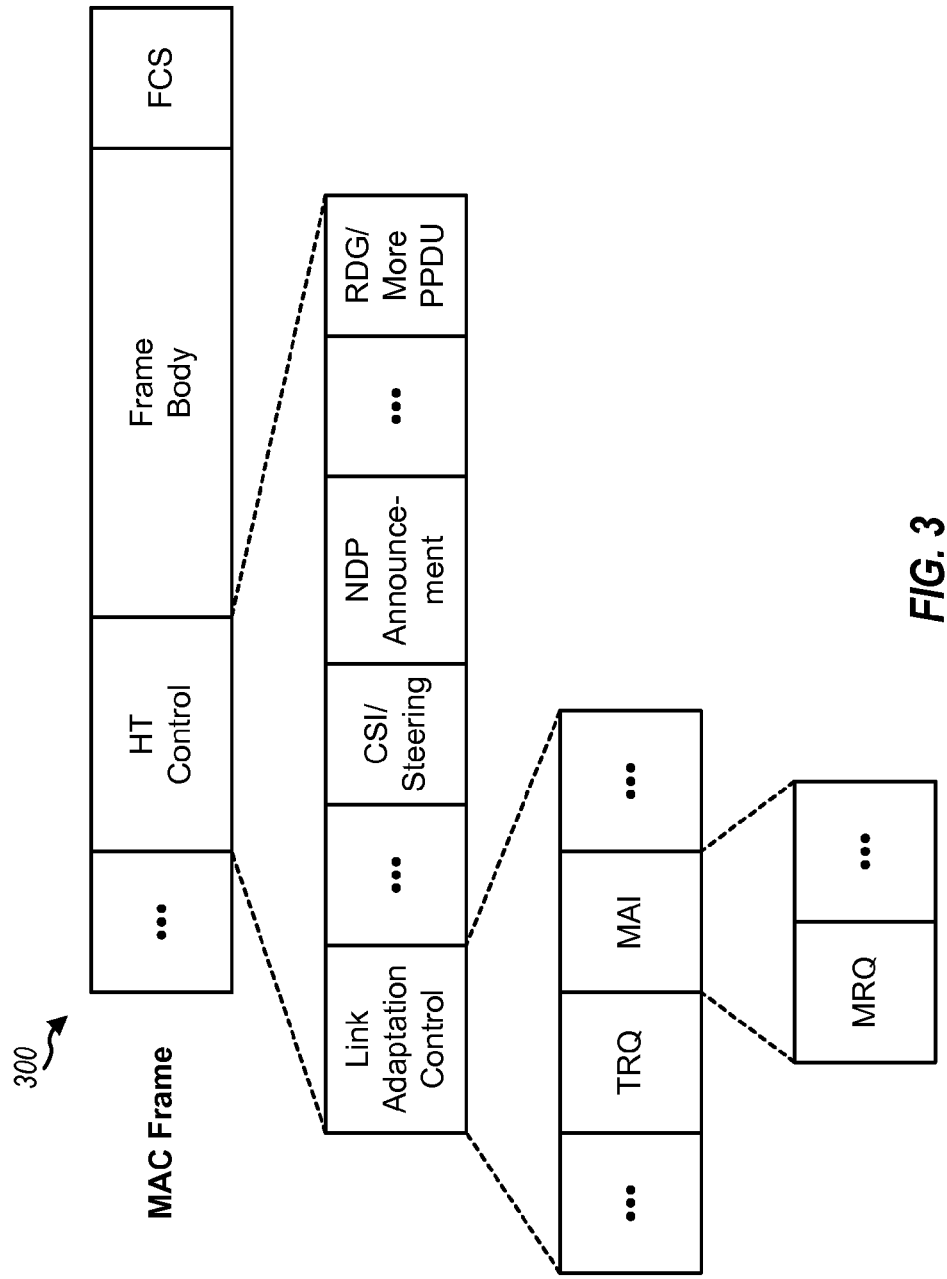
FIG. 3 shows a MAC frame format in IEEE 802.11n.

FIG. 3 shows a structure of a MAC frame 300 in IEEE 802.11n. MAC frame 300 includes various fields such as an HT Control field, a Frame Body field, and a frame check sequence (FCS) field. The Frame Body field carries data for the MAC frame. The FCS field carries an FCS value, which is generated based on the contents of the other fields in the MAC frame and is used for error detection of the MAC frame. The HT Control field includes various fields such as a Link Adaptation Control field, a CSI/Steering field, an NDP Announcement field, and a reverse direction grant (RDG)/More PPDU field. The Link Adaptation Control field includes a training request (TRQ) field and an MCS request or Antenna Selection Indication (MAI) field. The MAI field includes a modulation coding scheme (MCS) request (MRQ) field. Table 1 lists the various MAC fields shown in FIG. 3 and provides a description for each MAC field. The formats of the MAC frame and fields and the different types of explicit feedback indicated by the CSI/Steering field are described in the aforementioned IEEE 802.11n documents.

TABLE 1

| MAC field | Description |
| --- | --- |
| TRQ | 0 = responder is not requested to send a sounding PPDU,<br>1 = responder is requested to send a sounding PPDU. |
| MRQ | 0 = no MCS feedback is requested,<br>1 = MCS feedback is requested. |
| CSI/<br>Steering | 0 = no feedback required,<br>1 = request for CSI feedback,<br>2 = request for non-compressed beamforming feedback matrix,<br>3 = request for compressed beamforming feedback matrix. |
| NDP<br>Announcement | 0 = no NDP will follow,<br>1 = NDP will follow. |
| RDG/<br>More PPDU | 0 = PPDU carrying MAC frame is the last transmission,<br>1 = PPDU carrying MAC frame is followed by another PPDU,<br>0 = no reverse direction grant being sent,<br>1 = reverse direction grant is present. |

Table 2 lists two sounding types and provides a short description for each sounding type. An NDP carries no MAC frame and thus no HT Control field. Hence, there may be certain restrictions on the use of the NDP as well as the manner in which the NDP may be sent.

TABLE 2

| Sounding Type | Description |
| --- | --- |
| MPDU sounding | Use of a sounding PPDU carrying data and the HT Control field. |
| NDP sounding | Use of a sounding PPDU carrying no data and no HT Control field. |

Table 3 lists two beamforming schemes/feedback types supported by IEEE 802.11n and provides a short description for each feedback type.

TABLE 3

| Feedback Type | Description |
| --- | --- |
| Implicit feedback | Beamformee transmits a sounding PPDU.<br>Beamformer derives a MIMO channel estimate from the sounding PPDU and computes steering matrices based on the MIMO channel estimate. |
| Explicit feedback | Beamformer transmits a sounding PPDU.<br>Beamformee derives a MIMO channel estimate from the sounding PPDU and sends feedback to beamformer. Beamformer computes steering matrices based on the feedback. |

Implicit feedback may be used in a time division duplexing (TDD) network in which transmissions between stations are sent on one frequency channel in a time-shared manner. In this case, the channel response for one link may be assumed to be reciprocal of the channel response for the other link. Explicit feedback may be used for both TDD and frequency division duplexing (FDD) networks.

Beamforming may be used if a transmitter station and a receiver station both support the same feedback type, which may be implicit feedback or explicit feedback. If one station supports only implicit feedback and the other station supports only explicit feedback, then beamforming may not be available for these stations due to interoperability issues between the two feedback types. The two feedback types are incompatible for several reasons. First, a station that supports only implicit feedback would not be able to send appropriate feedback to a station that supports only explicit feedback. Second, no mechanism may be available to induce a station that supports only explicit feedback to send a sounding PPDU. Furthermore, the two sounding types may be incompatible.

In an aspect, a station may be designed with the following capabilities in order to support both implicit feedback and explicit feedback for beamforming:
1. Transmission and reception of sounding PPDUs,
2. Respond to training request (TRQ) by sending a sounding PPDU, and
3. Respond to request for explicit feedback.

By supporting the set of capabilities given above, the station would be able to perform implicit or explicit beamforming with another station supporting the same set of capabilities.

In one design, a station may support only NDP sounding, or only MPDU sounding, or both NDP and MPDU sounding. The sounding capability of the station may be advertised via a transmit beamforming (TxBF) Capability field that is included in certain frames such as beacon, association request, association response, probe request, and probe response frames. In another design, a beamformer may support transmission of NDP sounding and reception of staggered sounding, and a beamformee may support reception of NDP sounding and transmission of staggered sounding. In IEEE 802.11n, reference for multiple dimensions is spread across multiple training symbols using a defined orthonormal matrix. With staggered sounding, this spreading is done separately for the training symbols associated with the data dimensions and the training symbols associated with the extra spatial dimensions (extension spatial streams in 802.11n). In this way, the sounding for the extension spatial streams may be separated in time from the sounding for the data dimensions. Staggered sounding may be used when the number of dimensions to be sounded is greater than the number of data dimensions, or space time streams ($N_{STS}$). Staggered sounding may be available only for MPDU sounding and may be used to sound extra dimensions in MPDU sounding. The beamformee may respond to a CSI feedback request sent with an NDP by the beamformer. The beamformer may respond to a sounding request by the beamformee.

Beamforming may be performed with implicit feedback or explicit feedback, which may be supported with NDP and/or MPDU sounding. Beamforming may also be performed for a unidirectional transmission from one station to another station or for bidirectional transmission between the two stations. Different sequences of frames may be exchanged for different beamforming scenarios. For clarity, example frame exchanges for some beamforming scenarios are described below.

Figure 4:
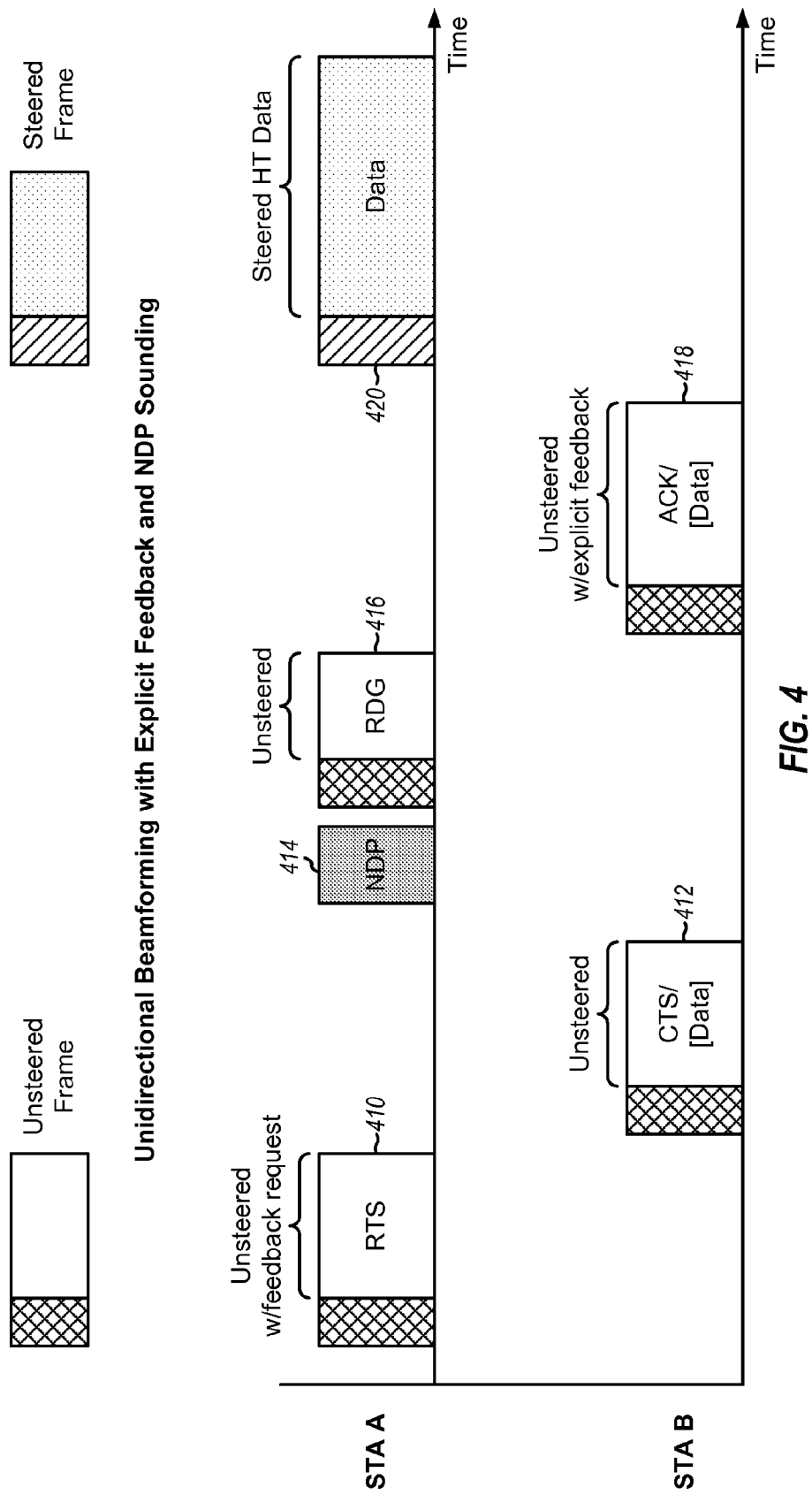
FIG. 4 shows unidirectional explicit beamforming with NDP sounding.

FIG. 4 shows an example frame exchange for unidirectional explicit beamforming with NDP sounding. Station A may transmit an unsteered frame 410 with a feedback request for one of the feedback types listed in Table 1. An unsteered frame is a frame sent without beamforming, and a steered frame is a frame sent with beamforming. Frame 410 may be a Request to Send (RTS) frame containing a requested duration for the amount of time needed to transmit pending data and associated signaling. Frame 410 may have the NDP Announcement field set to 1 to indicate that an NDP will follow. Station B may receive RTS frame 410, grant the request, and transmit an unsteered Clear to Send (CTS) frame 412, which may carry any data that station B may have for station A. The RTS and CTS frames are control frames that may be exchanged to reserve the wireless medium and avoid interference from hidden stations. The RTS and CTS frames may also be omitted.

Station A may send an NDP 414 and an unsteered frame 416, which may be a data frame or some other frame. NDP 414 may be sent within a short interframe space (SIFS) time of the end of frame 412. Frame 416 may have the RDG field set to 1 to indicate a reverse direction grant, which may transfer control of the wireless medium to station B. Station B may estimate the MIMO channel response based on NDP 414 and generate explicit feedback of the type requested by station A. Station B may then transmit an unsteered frame 418 with the explicit feedback. Station A may receive the explicit feedback, derive steering matrices based on the feedback, and transmit a steered data frame 420 using the steering matrices for beamforming.

Unidirectional explicit beamforming with NDP sounding may also be performed in other manners. For example, the RTS and CTS frames may be omitted or replaced with frames of other types. NDP 414 may be sent within SIFS time after frame 416, which may have the NDP Announcement field set to 1 to indicate that an NDP will follow.

Figure 5:
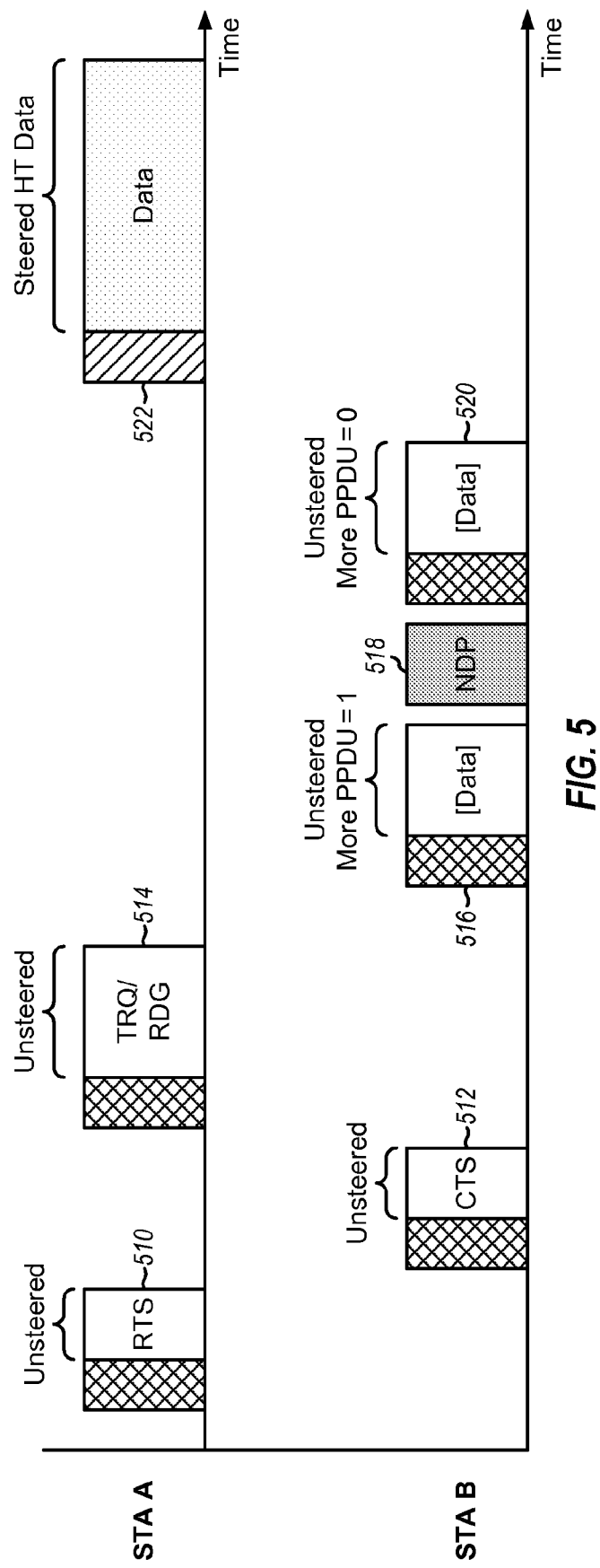
FIG. 5 shows unidirectional implicit beamforming with NDP sounding.

FIG. 5 shows an example frame exchange for unidirectional implicit beamforming with NDP sounding. Station A may transmit an unsteered RTS frame 510, and station B may return an unsteered CTS frame 512. Station A may then transmit an unsteered frame 514, which may have the TRQ field set to 1 to indicate a training request and the RDG field set to 1 to indicate a reverse direction grant. Station B may then transmit an unsteered frame 516, an NDP 518, and an unsteered frame 520 based on the reverse direction grant in frame 514. Frame 516 may have the NDP Announcement field set to 1 to indicate that an NDP will follow and may have the More PPDU field set to 1 to indicate that another frame will follow. NDP 518 may be sent within SIFS time after frame 516. Frame 520 may have the More PPDU field set to 0 to indicate that no other frame will follow. Station A may estimate the MIMO channel response based on NDP 518, derive steering matrices based on the MIMO channel estimate, and transmit a steered data frame 522 using the steering matrices for beamforming.

Unidirectional implicit beamforming with NDP sounding may also be performed in other manners. For example, the RTS and CTS frames may be omitted or replaced with frames of other types. Frame 516 may have the NDP Announcement field set to 1, and frame 518 may be omitted.

Figure 6:
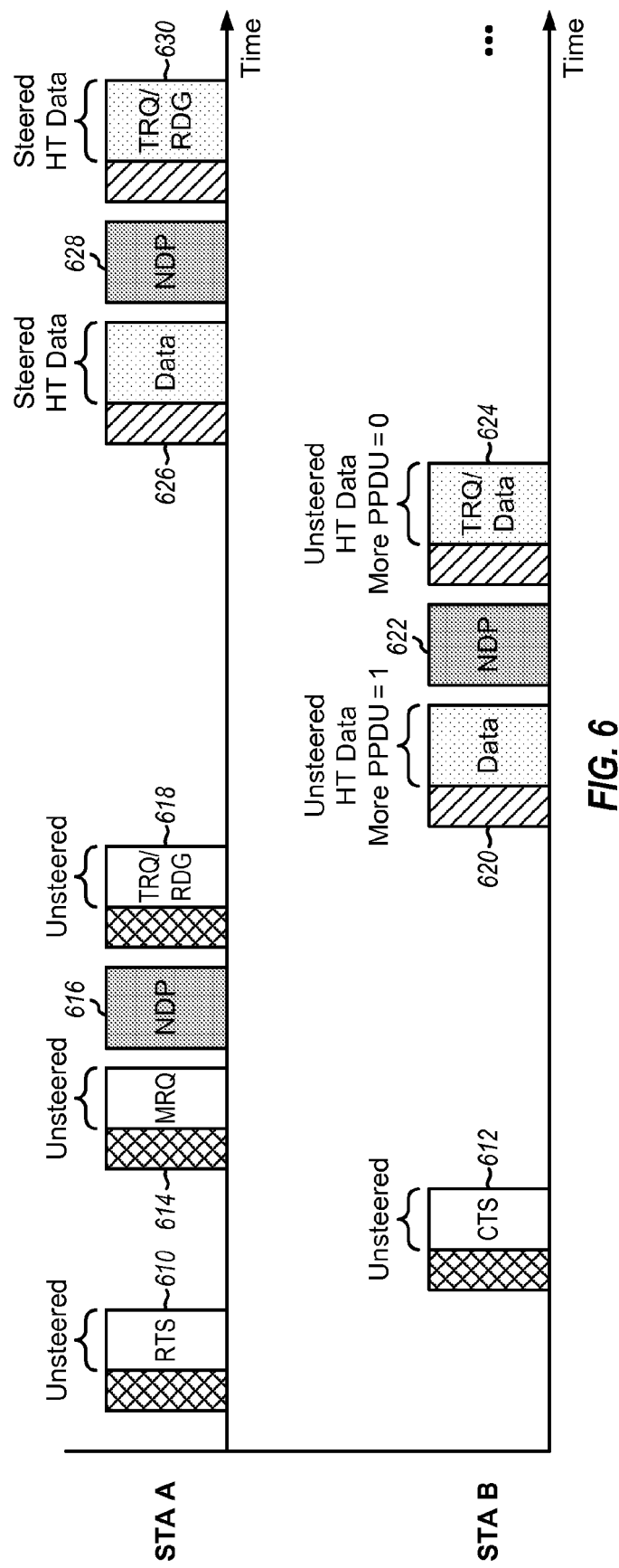
FIG. 6 shows bidirectional implicit beamforming with NDP sounding.

FIG. 6 shows an example frame exchange for bidirectional implicit beamforming with NDP sounding. Station A may transmit an unsteered RTS frame 610, and station B may return an unsteered CTS frame 612. Station A may then transmit an unsteered frame 614, an NDP 616, and an unsteered frame 618. Frame 614 may have the MRQ field set to 1 to request for MCS. Frame 618 may have the TRQ field set to 1 to indicate a training request and the RDG field set to 1 to indicate a reverse direction grant. Station B may estimate the MIMO channel response based on NDP 616 and derive steering matrices based on the MIMO channel estimate. Station B may then transmit a steered frame 620, an NDP 622, and a steered frame 624 using the steering matrices for beamforming. Frame 620 may respond to the RDG and may have the More PPDU field set to 1 to indicate that another frame will follow. Frame 624 may have the TRQ field set to 1 to request training and the More PPDU field set to 0 to indicate that no other frame will follow. Frame 620 and/or 624 may carry any data that station B may have to send to station A.

Station A may estimate the MIMO channel response based on NDP 622 and derive steering matrices based on the MIMO channel estimate. Station A may then transmit a steered frame 626, an NDP 628 in response to the TRQ in frame 624, and a steered frame 630. Frame 630 may have the TRQ field set to 1 to indicate a training request and the RDG field set to 1 to indicate a reverse direction grant. Each station may transmit additional frames with beamforming in similar manner.

Bidirectional implicit beamforming with NDP sounding may also be performed in other manners. For example, the RTS and CTS frames may be omitted or replaced with frames of other types. Frames 614, 620 and/or 626 may each have the NDP Announcement field set to 1, and frames 618, 624 and/or 630 may be omitted.

Bidirectional explicit beamforming with NDP sounding may be performed based on a combination of FIGS. 4 and 6. Stations A and B may both transmit NDPs, as shown in FIG. 6. Each station may derive explicit feedback based on the NDP received from the other station and may send the explicit feedback to the other station. Each station may derive steering matrices based on the explicit feedback received from the other station and may transmit steered frames with the steering matrices.

Figure 7:
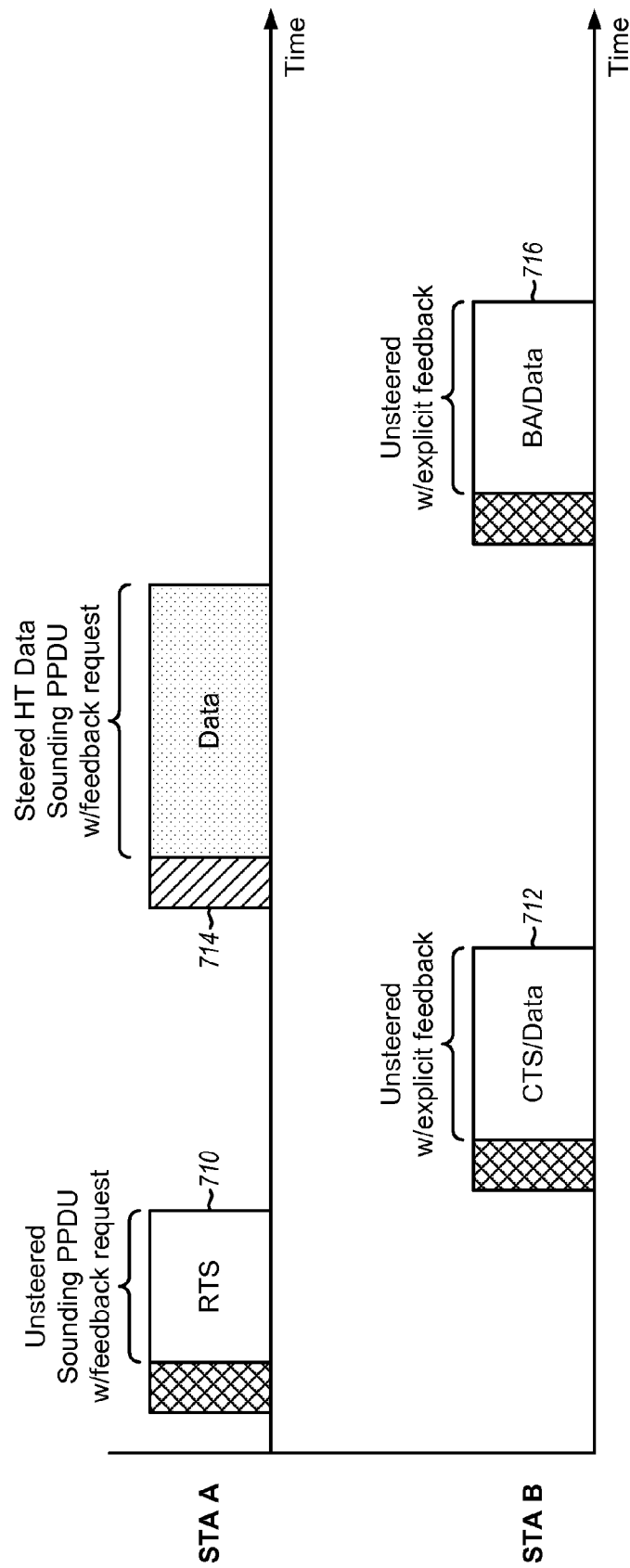
FIG. 7 shows unidirectional explicit beamforming with MPDU sounding.

FIG. 7 shows an example frame exchange for unidirectional explicit beamforming with MPDU sounding. Station A may transmit an unsteered RTS frame 710 in a sounding PPDU. Frame 710 may include a feedback request for one of the feedback types listed in Table 1. Station B may estimate the MIMO channel response based on the sounding PPDU and may generate explicit feedback of the type requested by station A. Station B may then transmit an unsteered CTS frame 712, which may carry the explicit feedback. Station A may derive steering matrices based on the explicit feedback received from station B and may transmit a steered data frame 714 using the steering matrices for beamforming. Frame 714 may be sent in a sounding PPDU and may include a feedback request for updated feedback. Station B may estimate the MIMO channel response based on the sounding PPDU and may generate explicit feedback of the type requested by station A. Station B may then transmit an unsteered frame 716 carrying the explicit feedback and a block acknowledgement (BA) for the data sent in frame 714.

Figure 8:
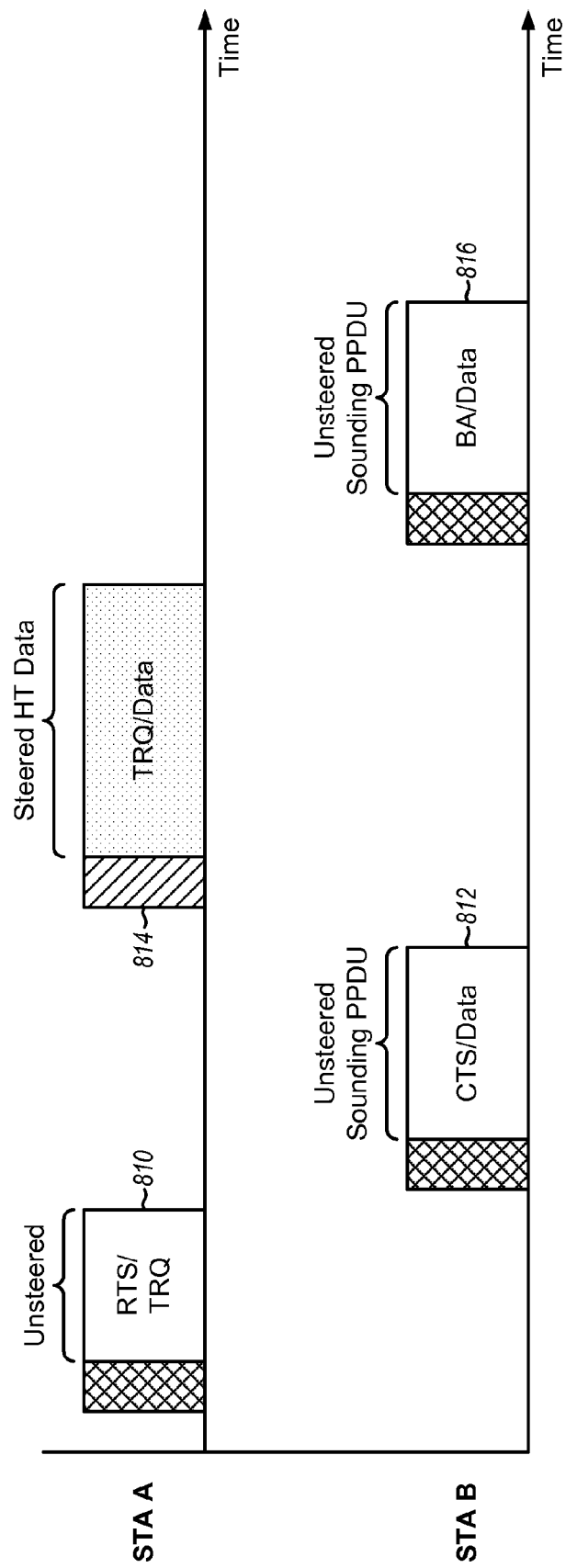
FIG. 8 shows unidirectional implicit beamforming with MPDU sounding.

FIG. 8 shows an example frame exchange for unidirectional implicit beamforming with MPDU sounding. Station A may transmit an unsteered RTS frame 810, which may have the TRQ field set to 1 to indicate a training request. Station B may then transmit an unsteered CTS frame 812 in a sounding PPDU. Frame 812 may carry any data that station B may have to send to station A. Station A may derive steering matrices based on the sounding PPDU received from station B and may transmit a steered data frame 814 using the steering matrices for beamforming. Frame 814 may have the TRQ field set to 1 to indicate a training request. Station B may then transmit an unsteered frame 816 in a sounding PPDU. Frame 816 may carry a block Ack for the data sent in frame 814.

Figure 9:
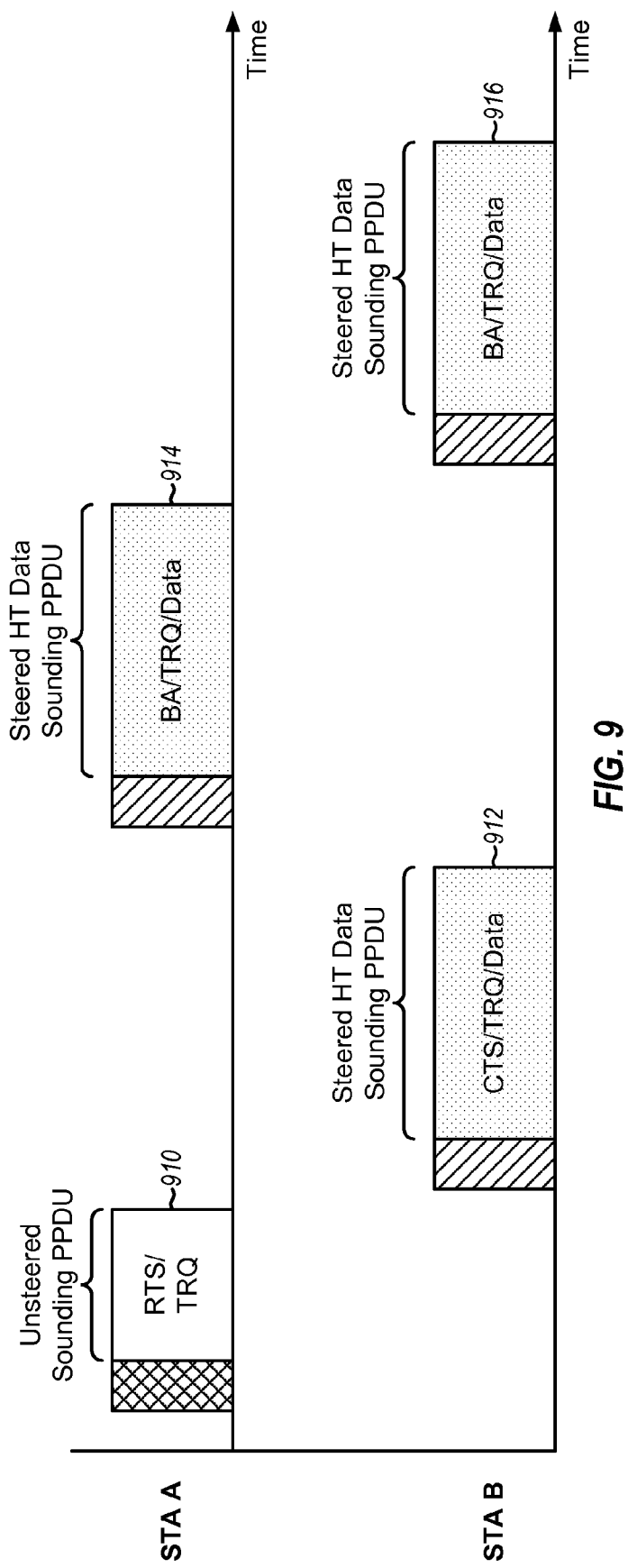
FIG. 9 shows bidirectional implicit beamforming with MPDU sounding.

FIG. 9 shows an example frame exchange for bidirectional implicit beamforming with MPDU sounding. Station A may transmit an unsteered RTS frame 910 in a sounding PPDU. Frame 910 may have the TRQ field set to 1 to indicate a training request. Station B may estimate the MIMO channel response based on the sounding PPDU from station B and may derive steering matrices based on the MIMO channel estimate. Station B may then transmit a steered CTS frame 912 in a sounding PPDU. Frame 912 may have the TRQ field set to 1 to indicate a training request and may carry any data that station B may have to send to station A. Station A may derive steering matrices based on the sounding PPDU received from station B and may transmit a steered data frame 914 using the steering matrices for beamforming. Frame 914 may carry a block Ack for any data sent in frame 912 and may have the TRQ field set to 1 to indicate a training request. Station B may derive steering matrices based on the sounding PPDU received from station A and may transmit a steered data frame 918 in a sounding PPDU. Frame 918 may carry a block Ack for the data sent in frame 914, a training request, and data.

Beamforming with MPDU sounding in FIGS. 7, 8 and 9 may also be performed in other manners. For example, the RTS and CTS frames may be replaced with frames of other types.

Bidirectional explicit beamforming with MPDU sounding may be performed based on a combination of FIGS. 7 and 9. Stations A and B may both transmit sounding PPDUs, as shown in FIG. 9. Each station may derive explicit feedback based on the sounding PPDU received from the other station and may send the explicit feedback to the other station. Each station may derive steering matrices based on the explicit feedback received from the other station and may transmit steered frames with the steering matrices.

Beamforming with implicit feedback assumes a reciprocal MIMO channel between stations A and B. This allows station A to (i) estimate the MIMO channel response for the link from station B to station A based on a sounding PPDU received from station B and (ii) use this MIMO channel estimate as an estimate the MIMO channel response for the other link from station A to station B. However, if the responses of the transmit chains are different from the responses of the receive chains at station A or at station B, then the differences would impact the reciprocity of the MIMO channel.

Stations A and B may perform calibration to determine the differences between their transmit and receive chains and to derive correction vectors that may be applied to account for the differences and restore reciprocity. Calibration is not required for beamforming but, if performed, may improve beamforming performance. Stations A and B may perform calibration at association and/or at other times.

Figure 10:
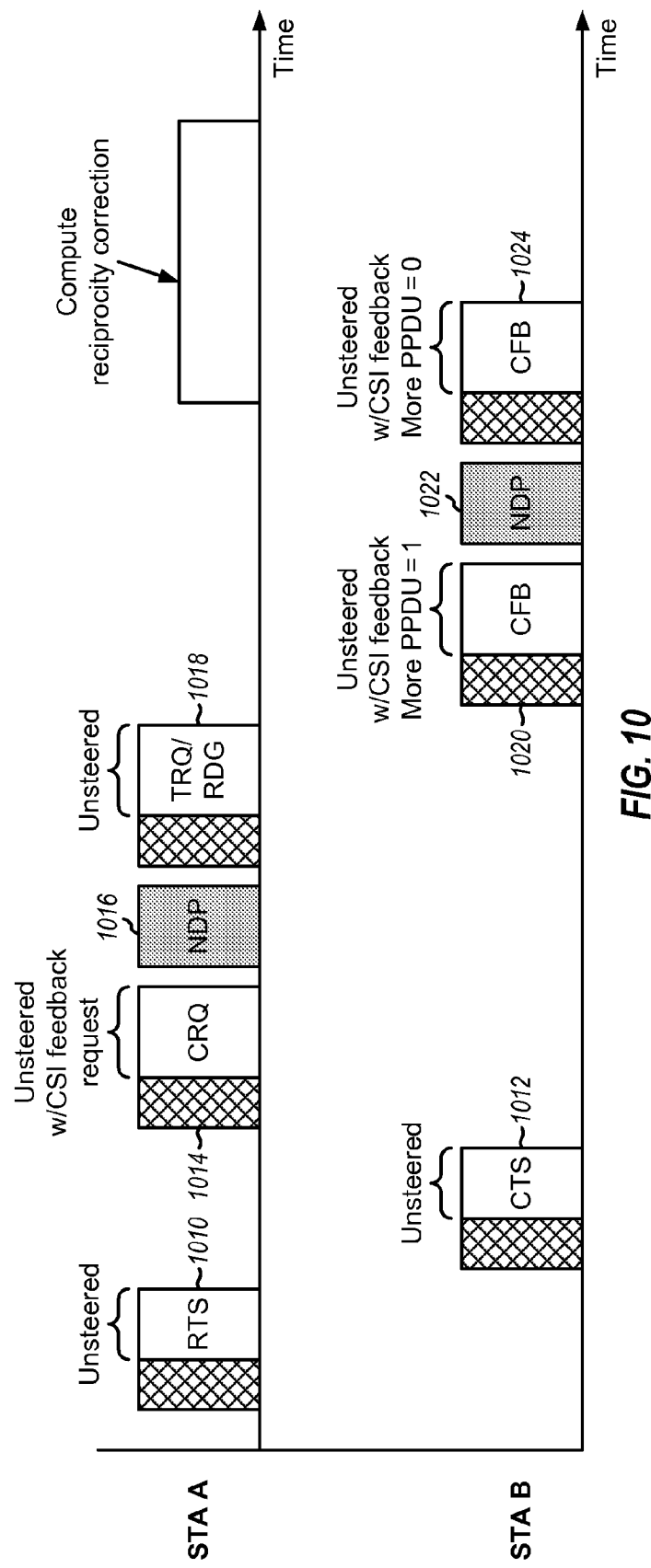
FIG. 10 shows calibration with NDP sounding.

FIG. 10 shows an example frame exchange for calibration with explicit CSI feedback and NDP sounding. Station A may transmit an unsteered RTS frame 1010, and station B may return an unsteered CTS frame 1012. Station A may then transmit an unsteered frame 1014, an NDP 1016, and an unsteered frame 1018. Frame 1014 may have the CSI/Steering field set to 1 to request CSI feedback and may indicate that full precision CSI feedback should be sent back. Frame 1018 may have the TRQ field set to 1 for a training request and the RDG field set to 1 to indicate a reverse direction grant.

Station B may estimate the MIMO channel response based on NDP 1016 and may generate CSI feedback as described in the aforementioned IEEE 802.11n documents. Station B may then transmit an unsteered frame 1020, an NDP 1022, and an unsteered frame 1024. Frame 1020 may carry the CSI feedback and may have the More PPDU field set to 1 to indicate that another frame will follow. Frame 1024 may also carry the CSI feedback and may have the More PPDU field set to 0 to indicate that no other frame will follow.

Station A may estimate the MIMO channel response based on NDP 1022 from station B. Station A may then compute reciprocity correction vectors based on the MIMO channel estimate determined by station A and the CSI feedback received from station B. Station A may apply the reciprocity correction vectors in future transmission to station B.

Figure 11:
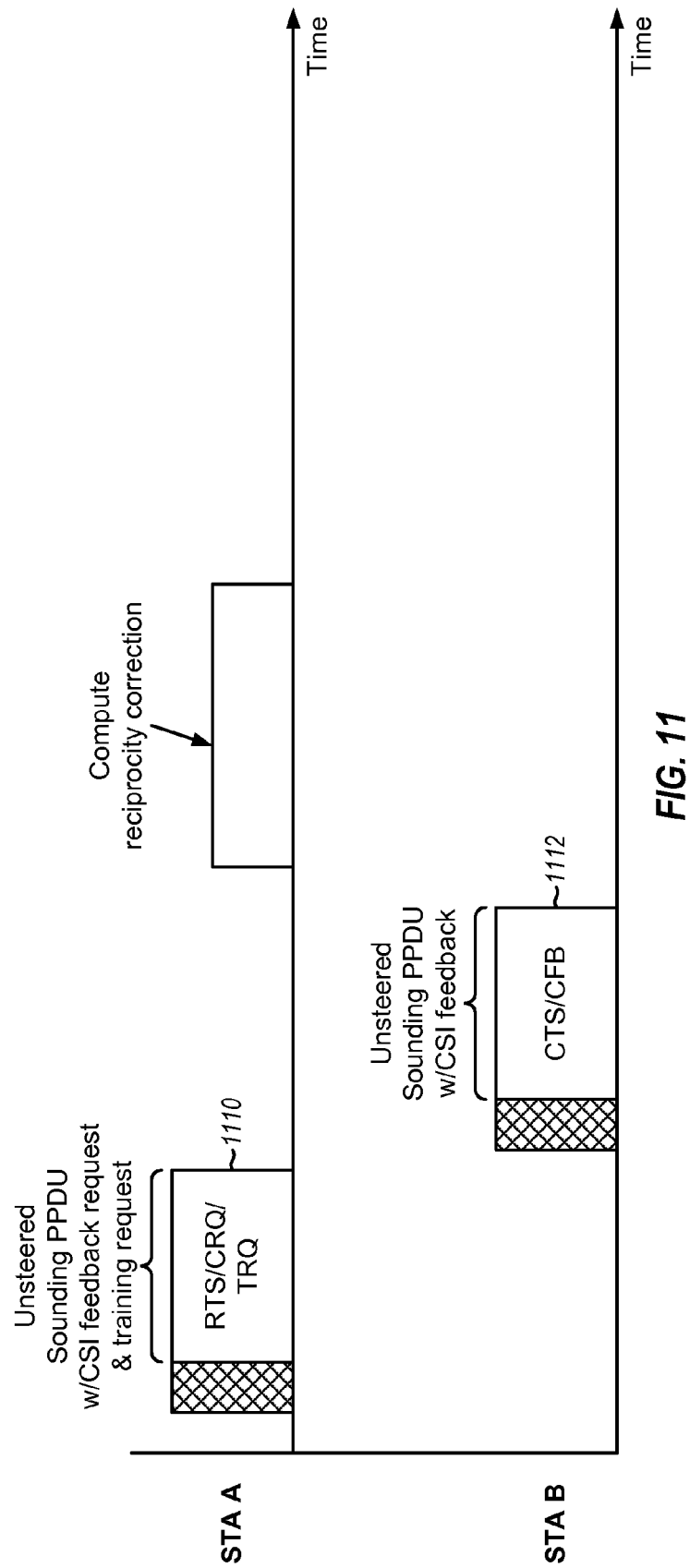
FIG. 11 shows calibration with MPDU sounding.

FIG. 11 shows an example frame exchange for calibration with explicit CSI feedback and MPDU sounding. Station A may transmit an unsteered RTS frame 1110 in a sounding PPDU. Frame 1110 may have the CSI/Steering field set to 1 to request CSI feedback and the TRQ field set to 1 to indicate a training request. Station B may estimate the MIMO channel response based on the sounding PPDU received from station A and may generate CSI feedback. Station B may then transmit an unsteered CTS frame 1112, which may carry the CSI feedback, in a sounding PPDU. Station A may estimate the MIMO channel response based on the sounding PPDU received from station B and may compute reciprocity correction vectors based on the MIMO channel estimate and the explicit feedback.

Figure 12:
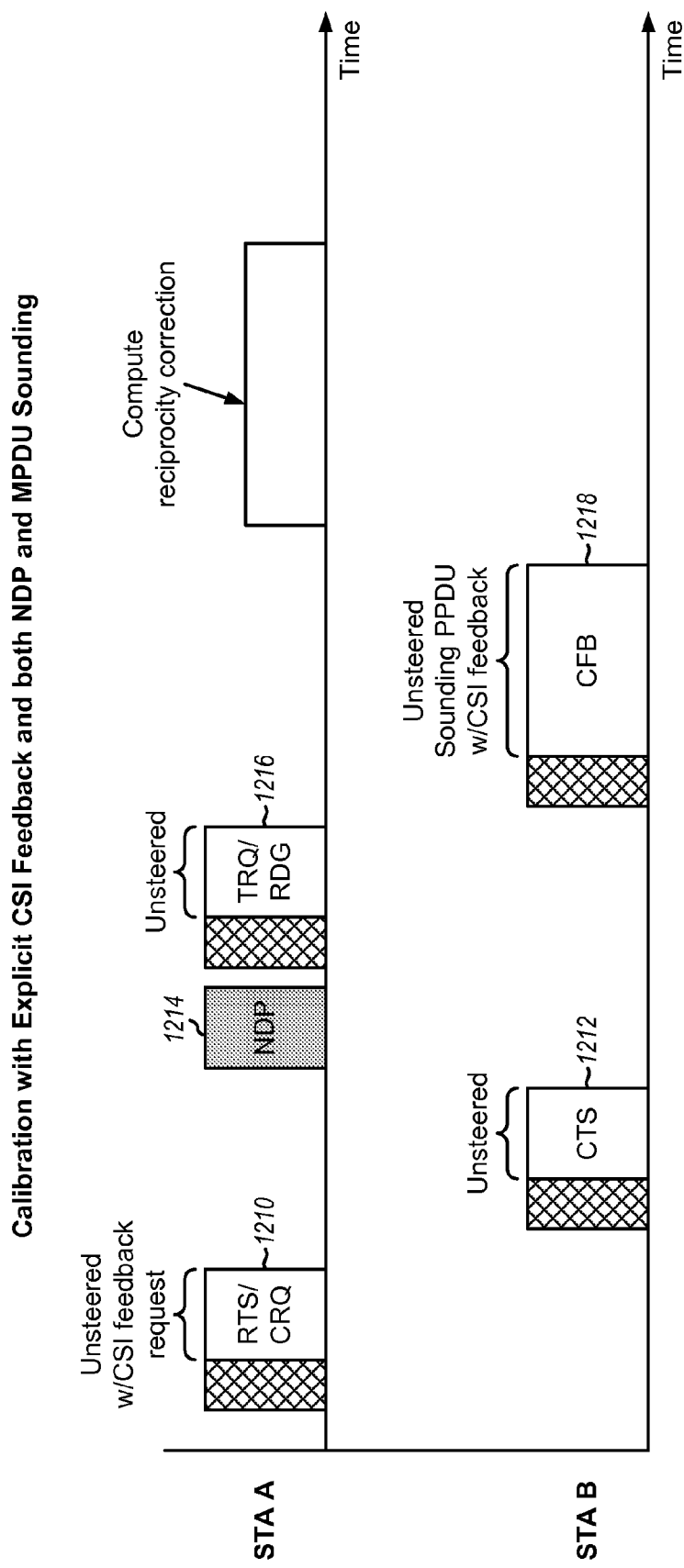
FIG. 12 shows calibration with both NDP and MPDU sounding.

FIG. 12 shows an example frame exchange for calibration with explicit CSI feedback and both NDP and MPDU sounding. Station A may transmit an unsteered RTS frame 1210, which may have the CSI/Steering field set to 1 to request CSI feedback. Station B may return an unsteered CTS frame 1212. Station A may then transmit an NDP 1214 and an unsteered frame 1216. Frame 1216 may have the TRQ field set to 1 for a training request and the RDG field set to 1 to indicate a reverse direction grant. Station B may estimate the MIMO channel response based on NDP 1214 from station A and may generate CSI feedback. Station B may then transmit an unsteered frame 1218 in a sounding PPDU. Frame 1218 may carry the CSI feedback and may have the More PPDU field set to 0 to indicate that no other frame will follow. Station A may estimate the MIMO channel response based on the sounding PPDU received from station B and may compute reciprocity correction vectors based on the MIMO channel estimate and the explicit feedback.

Calibration may also be performed in other manners. For example, the RTS and CTS frames may be replaced with data frames or frames of other types. Frame 1014 and/or 1020 in FIG. 10 may have the NDP Announcement field set to 1, and frame 1018 and/or 1024 may be omitted. Station B may send an NDP or a sounding PPDU as soon as possible after the training request from station A. Station B may send the CSI feedback either in conjunction with the NDP or sounding PPDU or at a later time.

As shown in FIGS. 10, 11 and 12, calibration may be supported without using calibration-specific messages and frame exchanges. For calibration, the CSI feedback request may be sent using the CSI/Steering field in the HT Control field, as shown in FIG. 3 and Table 1. In one design, when a training request is included in the same frame as a CSI feedback request, full precision CSI matrices may be sent back for use to derive reciprocity correction vectors. In another design, a designated field may be used to indicate the start of calibration and to identify frames sent for calibration.

Figure 13:
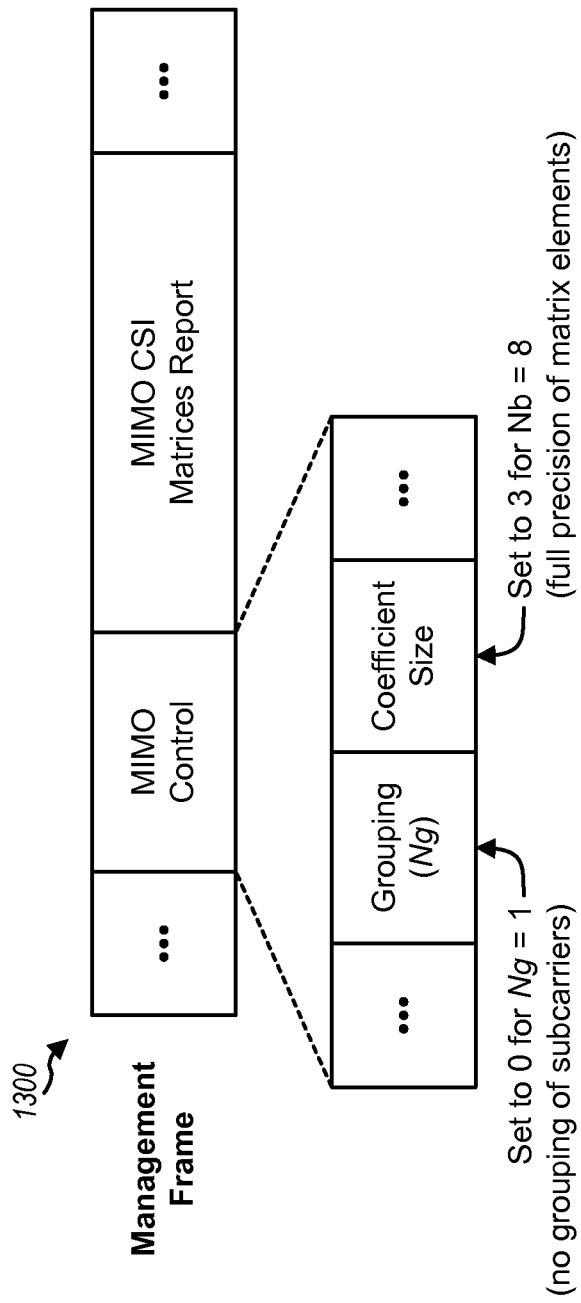
FIG. 13 shows a management frame for sending channel state information (CSI) feedback.

FIG. 13 shows a structure of a management frame 1300 that may be used to send CSI feedback for calibration. Frame 1300 includes various fields such as a MIMO Control field and a MIMO CSI Matrices Report field. The MIMO Control field includes various fields such as a Grouping (Ng) field and a Coefficient Size field. For calibration, the Grouping field may be set to 0 for Ng=1, which means no grouping of the subcarriers, so that a CSI matrix will be provided for each of the subcarriers {−28, ..., −1, +1, ..., +28} that may be used for transmission. The Coefficient Size field may be set to 3 for Nb=8, which means that eight bits of precision (or full precision) will be used for each element of each CSI matrix. The MIMO CSI Matrices Report field may carry a CSI matrix for each subcarrier that may be used for transmission, with each matrix element being represented with full precision.

FIG. 14 shows a design of a process 1400 for supporting beamforming by a station. The station may receive a training request (block 1412) and may send a first sounding frame in response to the training request (block 1414). The station may receive a request for explicit feedback for beamforming (block 1416) and may also receive a second sounding frame (block 1418). The station may generate the explicit feedback based on the second sounding frame (block 1420) and may send the explicit feedback in response to the request for explicit feedback (block 1422). The processing in blocks 1412 through 1422 may be for one or more independent frame exchanges. The processing in blocks 1412 through 1422 may exercise the capabilities given above to support both implicit feedback and explicit feedback for beamforming. In particular, transmission and reception of sounding PPDUs are covered in blocks 1414 and 1418, respectively. Response to a training request by sending a sounding PPDU is covered in blocks 1412 and 1414. Response to request for explicit feedback is covered in blocks 1416 to 1422.

Each frame may correspond to a PPDU in IEEE 802.11 or some other type of PDU. Each sounding frame may be (i) an NDP having at least one training field but no data field or (ii) a frame having both training and data fields. The explicit feedback may comprise CSI matrices, non-compressed beamforming feedback matrices, compressed beamforming feedback matrices, etc.

The station may be an explicit beamformee and may receive a steered frame sent with beamforming based on the explicit feedback returned in block 1422. The station may be an implicit beamformee and may receive a steered frame sent with beamforming based on implicit feedback derived from the first sounding frame sent in block 1414. The station may be an explicit beamformer and may receive explicit feedback generated from the first sounding frame, derive steering information (e.g., steering matrices) based on the received explicit feedback, and send a steered frame with beamforming based on the steering information. The station may be an implicit beamformer and may receive a third sounding frame, derive steering information based on the third sounding frame, and send a steered frame with beamforming based on the steering information.

FIG. 15 shows a design of an apparatus 1500 for supporting beamforming. Apparatus 1500 includes means for receiving a training request (module 1512), means for sending a first sounding frame in response to the training request (module 1514), means for receiving a request for explicit feedback for beamforming (module 1516), means for receiving a second sounding frame (module 1518), means for generating the explicit feedback based on the second sounding frame (module 1520), and means for sending the explicit feedback in response to the request for explicit feedback (module 1522).

Figure 16:
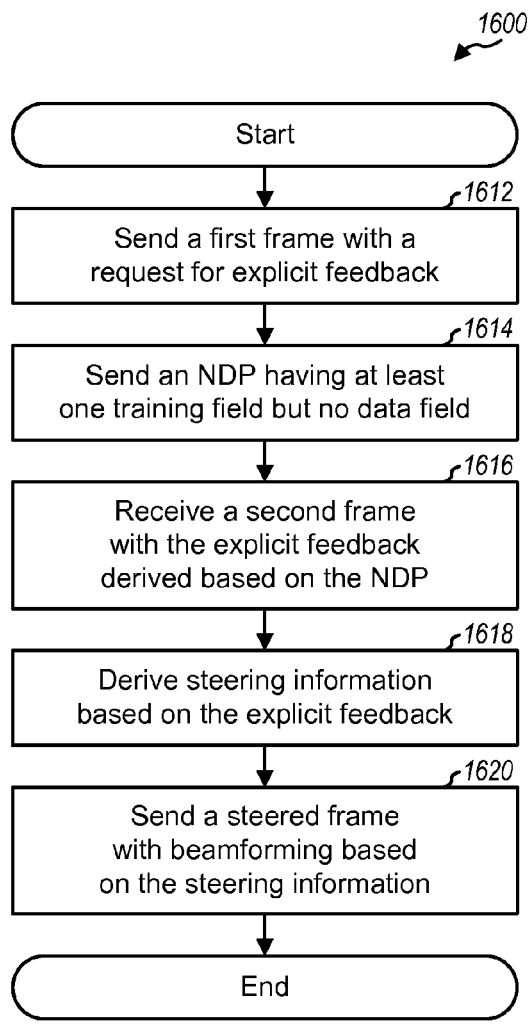
FIGS. 16 and 17 show explicit beamforming with NDP sounding.

FIG. 16 shows a design of a process 1600 for beamforming with explicit feedback and NDP sounding. A station may send a first frame (e.g., frame 410 in FIG. 4) with a request for explicit feedback (block 1612). The station may send an NDP (e.g., NDP 414) having at least one training field but no data field (block 1614). The station may receive a second frame with the explicit feedback derived based on the NDP, e.g., frame 418 (block 1616). The station may derive steering information based on the explicit feedback (block 1618) and may send a steered frame (e.g., frame 420) with beamforming based on the steering information (block 1620).

The station may send an RTS frame as the first frame, receive a CTS frame in response to the RTS frame, and send the NDP within a SIFS time of the CTS frame. The station may send a third frame with an RDG (e.g., frame 416) within a SIFS time of the NDP and may receive the second frame after the third frame. The station may include, in either the first frame or the third frame, an announcement that an NDP will follow.

Figure 17:
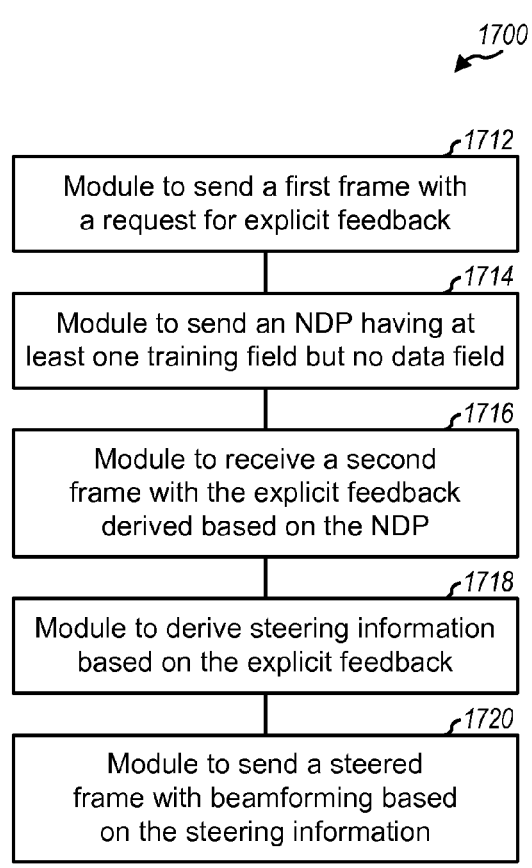

FIG. 17 shows a design of an apparatus 1700 for beamforming with explicit feedback and NDP sounding. Apparatus 1700 includes means for sending a first frame with a request for explicit feedback (module 1712), means for sending an NDP having at least one training field but no data field (module 1714), means for receiving a second frame with the explicit feedback derived based on the NDP (module 1716), means for deriving steering information based on the explicit feedback (module 1718), and means for sending a steered frame with beamforming based on the steering information (module 1720).

Figure 18:
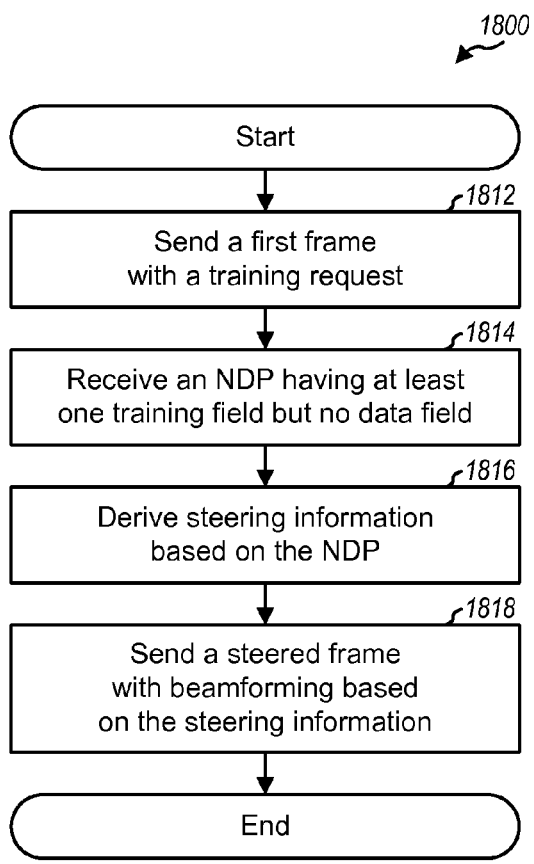
FIGS. 18 and 19 show implicit beamforming with NDP sounding.

FIG. 18 shows a design of a process 1800 for beamforming with implicit feedback and NDP sounding. A station may send a first frame (e.g., frame 514 in FIG. 5) with a training request (block 1812). The station may receive an NDP (e.g., NDP 518) having at least one training field but no data field (block 1814). The station may derive steering information based on the NDP (block 1816) and may send a steered frame (e.g., frame 522) with beamforming based on the steering information (block 1818).

The station may send an RTS frame (e.g., frame 510), receive a CTS frame (e.g., frame 512) in response to the RTS frame, and send the first frame after the CTS frame. The station may include an RDG in the first frame, receive a second frame (e.g., frame 516) in response to the first frame, and receive the NDP after the second frame. The second frame may include an announcement that an NDP will follow. The second frame may also include an indication that another frame will follow, and the station may then receive a third frame (e.g., frame 520) with an indication that no other frame will follow.

Figure 19:
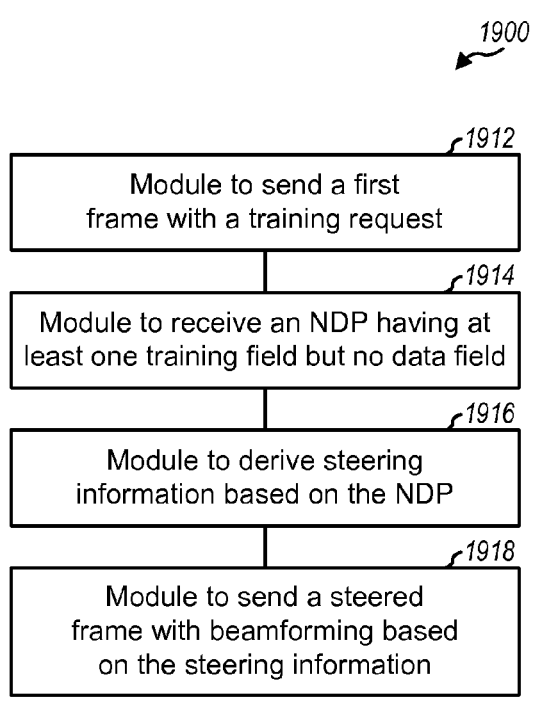

FIG. 19 shows a design of an apparatus 1900 for beamforming with implicit feedback and NDP sounding. Apparatus 1900 includes means for sending a first frame with a training request (module 1912), means for receiving an NDP having at least one training field but no data field (module 1914), means for deriving steering information based on the NDP (module 1916), and means for sending a steered frame with beamforming based on the steering information (module 1918).

Figures 20, 21:
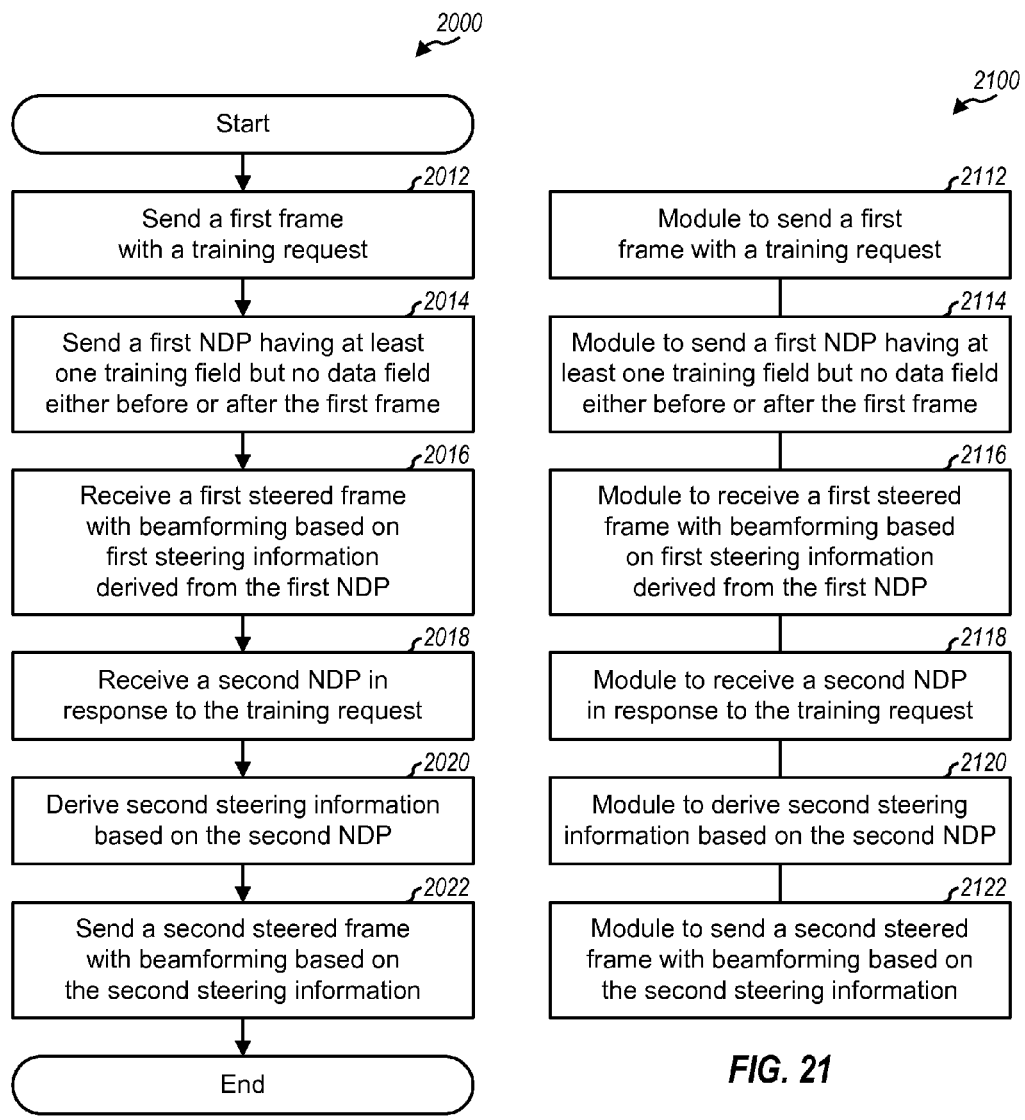
FIGS. 20 and 21 show bidirectional implicit beamforming with NDP sounding.

FIG. 20 shows a design of a process 2000 for bidirectional beamforming with implicit feedback and NDP sounding. A station may send a first frame (e.g., frame 614 or 618 in FIG. 6) with a training request (block 2012). The station may send a first NDP (e.g., NDP 616) having at least one training field but no data field either before or after the first frame (block 2014). The station may receive a first steered frame (e.g., frame 620) with beamforming based on first steering information derived from the first NDP (block 2016). The station may receive a second NDP (e.g., NDP 622) in response to the training request (block 2018) and may derive second steering information based on the second NDP (block 2020). The station may then send a second steered frame (e.g., frame 626) with beamforming based on the second steering information (block 2022).

The station may send an RTS frame (e.g., frame 610), receive a CTS frame (e.g., frame 612) in response to the RTS frame, and send the first frame after the CTS frame. The first frame and/or the first steered frame may include an announcement that an NDP will follow.

FIG. 21 shows a design of an apparatus 2100 for bidirectional beamforming with implicit feedback and NDP sounding. Apparatus 2100 includes means for sending a first frame with a training request (module 2112), means for sending a first NDP having at least one training field but no data field either before or after the first frame (module 2114), means for receiving a first steered frame with beamforming based on first steering information derived from the first NDP (module 2116), means for receiving a second NDP in response to the training request (module 2118), means for deriving second steering information based on the second NDP (module 2120), and means for sending a second steered frame with beamforming based on the second steering information (module 2122).

Figure 22:
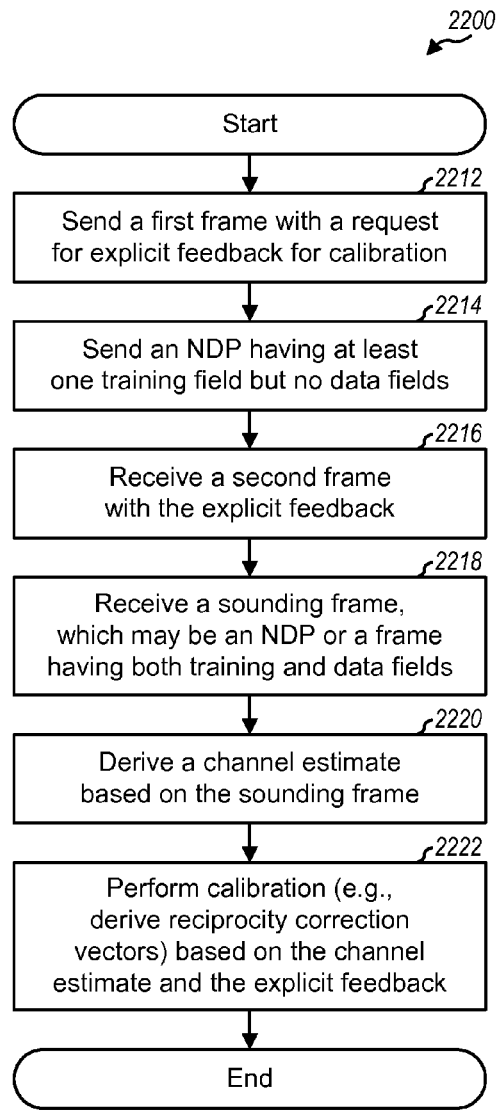
FIGS. 22 and 23 show calibration with NDP sounding.

FIG. 22 shows a design of a process 2200 for calibration with NDP sounding. A station may send a first frame (e.g., frame 1014 in FIG. 10 or frame 1210 in FIG. 12) with a request for explicit feedback for calibration (block 2212). The station may also send an NDP (e.g., NDP 1016 or 1214) having at least one training field but no data field (block 2214). The station may receive a second frame (e.g., frame 1020 in FIG. 10 or frame 1218 in FIG. 12) with the explicit feedback (block 2216). The station may also receive a sounding frame, which may be either an NDP such as NDP 1022 in FIG. 10 or a frame having both training and data fields such as frame 1218 in FIG. 12 (block 2218). The station may derive a channel estimate based on the sounding frame (block 2220). The station may then perform calibration (e.g., derive reciprocity correction vectors) based on the channel estimate and the explicit feedback (block 2222).

The first frame may include a training request and an announcement that an NDP will follow. Alternatively, the station may send a third frame (e.g., frame 1018 in FIG. 10 or frame 1216 in FIG. 12) with a training request after the NDP. In any case, the sounding frame may be sent in response to the training request.

Figure 23:
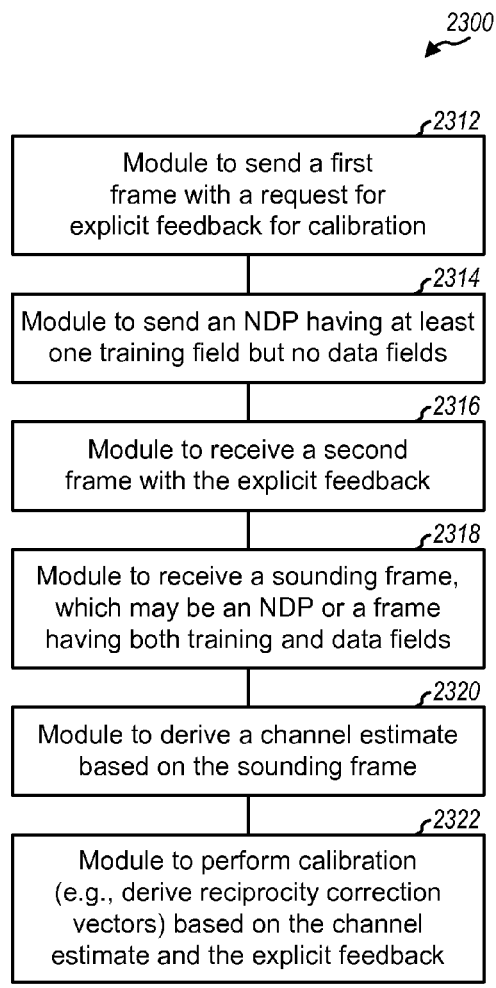

FIG. 23 shows a design of an apparatus 2300 for calibration with NDP sounding. Apparatus 2300 includes means for sending a first frame with a request for explicit feedback for calibration (module 2312), means for sending an NDP having at least one training field but no data field (module 2314), means for receiving a second frame with the explicit feedback (module 2316), means for receiving a sounding frame (module 2318), means for deriving a channel estimate based on the sounding frame (module 2320), and means for performing calibration based on the channel estimate and the explicit feedback (module 2322).

Figure 24:
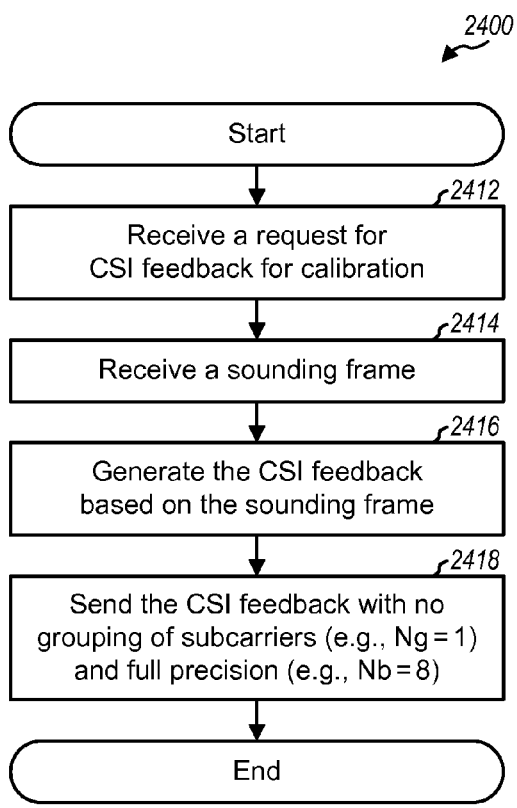
FIGS. 24 and 25 show transmission of CSI feedback for calibration.

FIG. 24 shows a design of a process 2400 for sending CSI feedback for calibration. A station may receive a request for CSI feedback for calibration, e.g., in frame 1014 in FIG. 10, frame 1110 in FIG. 1, or frame 1210 in FIG. 12 (block 2412). The station may also receive a sounding frame, e.g., NDP 1016 in FIG. 10, frame 1110 in FIG. 11, or NDP 1214 in FIG. 12 (block 2414). The station may generate the CSI feedback based on the sounding frame (block 2416) and may send the CSI feedback with no grouping of subcarriers and full precision (block 2418).

The station may send the CSI feedback in a management frame having a grouping field and a coefficient size field, as shown in FIG. 13. The station may set the grouping field to 0 to indicate no grouping of subcarriers (Ng=1) and may set the coefficient size field to 3 to indicate 8 bits (Nb=8) for full precision of the CSI feedback. The CSI feedback may comprise a CSI matrix for each of a plurality of subcarriers usable for transmission.

Figure 25:
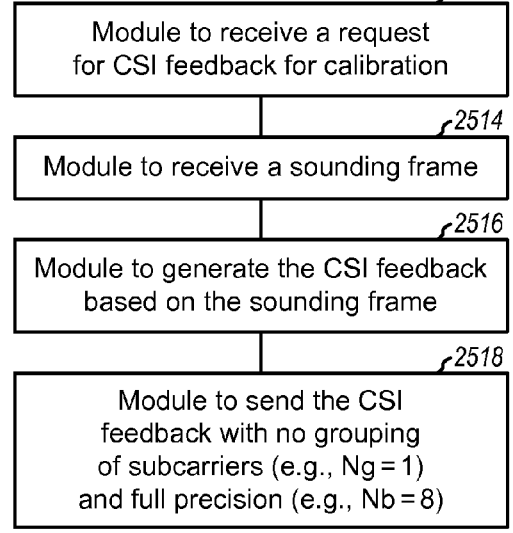

FIG. 25 shows a design of a process 2500 for sending CSI feedback for calibration. Apparatus 2500 includes means for receiving a request for CSI feedback for calibration (module 2512), means for receiving a sounding frame (module 2514), means for generating the CSI feedback based on the sounding frame (module 2516), and means for sending the CSI feedback with no grouping of subcarriers and full precision (module 2518).

The modules in FIGS. 15, 17, 19, 21, 23 and 25 may comprise processors, electronics devices, hardware devices, electronics components, logical circuits, memories, etc., or any combination thereof.

FIGS. 14 through 25 describe the processing by station A in FIGS. 4, 5, 6, 10, 11 and 12. The processing by station B is complementary to the processing by station A and may be described by a set of figures complementary to FIGS. 14 through 25. The processing by stations A and B in FIGS. 7, 8 and 9 may also be performed as shown in these figures.

Figure 26:
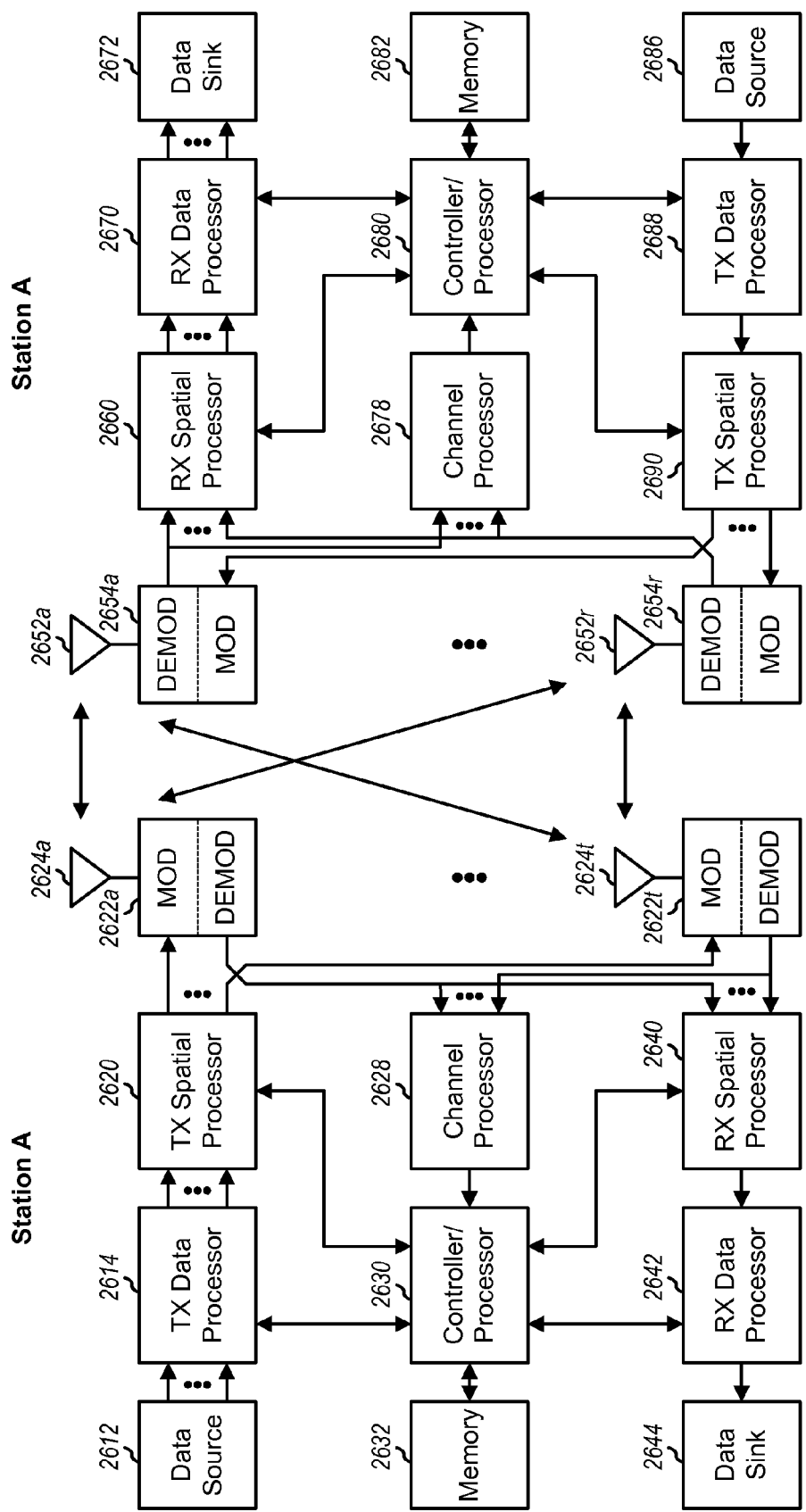
FIG. 26 shows a block diagram of two stations.

FIG. 26 shows a block diagram of a design of stations A and B, each of which may be access point 110 or one of stations 120 in FIG. 1. Station A is equipped with multiple (T) antennas 2624a through 2624t that may be used for data transmission and reception. Station B is equipped with multiple (R) antennas 2652a through 2652r that may be used for data transmission and reception.

At station A, a transmit (TX) data processor 2614 may receive traffic data from a data source 2612 and/or other data from a controller/processor 2630. TX data processor 2614 may process (e.g., format, encode, interleave, and symbol map) the received data and generate data symbols, which are modulation symbols for data. A TX spatial processor 2620 may multiplex the data symbols with training symbols, perform transmit spatial processing with steering matrices, and provide T streams of output symbols to T modulators (MOD) 2622a through 2622t. Training symbols are also commonly referred to as pilot symbols. Each modulator 2622 may process its output symbol stream (e.g., for OFDM) to generate an output chip stream. Each modulator 2622 may further condition (e.g., convert to analog, amplify, filter, and upconvert) its output chip stream to generate a modulated signal. T modulated signals from modulators 2622a through 2622t may be transmitted from antennas 2624a through 2624t, respectively.

At station B, R antennas 2652a through 2652r may receive the modulated signals from station A, and each antenna 2652 may provide a received signal to a respective demodulator (DEMOD) 2654. Each demodulator 2654 may perform processing complementary to the processing performed by modulators 2622 to obtain received symbols. A receive (RX) spatial processor 2660 may perform spatial matched filtering on the received symbols from all demodulators 2654a through 2654r and provide data symbol estimates, which are estimates of the data symbols transmitted by station A. An RX data processor 2670 may further process (e.g., symbol demap, deinterleave, and decode) the data symbol estimates and provide decoded data to a data sink 2672 and/or a controller/processor 2680.

A channel processor 2678 may process training symbols received from station A and may estimate the MIMO channel response. Processor 2678 may decompose a channel matrix for each subcarrier or each group of subcarriers of interest, e.g., as shown in equation (1), to obtain a corresponding beamforming matrix. Processor 2678 may generate feedback information for the channel matrices or the (non-compressed or compressed) beamforming matrices. Processor 2678 may provide the feedback information to controller/processor 2680 to send back to station A. Processor 2678 may also derive a spatial filter matrix for each subcarrier or each group of subcarriers of interest based on the corresponding channel matrix and/or beamforming matrix. Processor 2678 may provide the spatial filter matrices to RX spatial processor 2660 for spatial matched filtering.

The processing for transmission from station B to station A may be the same as or different from the processing for the transmission from station A to station B. Traffic data from a data source 2686 and/or other data (e.g., feedback information) from controller/processor 2680 may be processed (e.g., encoded, interleaved, and modulated) by a TX data processor 2688, and further multiplexed with training symbols and spatially processed by TX spatial processor 2690 with steering matrices. The output symbols from TX spatial processor 2690 may be further processed by modulators 2654a through 2654r to generate R modulated signals, which may be transmitted via antennas 2652a through 2652r.

At station A, the modulated signals from station B may be received by antennas 2624a through 2624t and processed by demodulators 2622a through 2622t to obtain received symbols. An RX spatial processor 2640 may perform spatial matched filtering on the received symbols and provide data symbol estimates. An RX data processor 2642 may further process the data symbol estimates, provide decoded data to a data sink 2644, and provide the feedback information to controller/processor 2630. Processor 2630 may derive steering matrices based on the feedback information.

A channel processor 2628 may process training symbols received from station B and may estimate the MIMO channel response. Processor 2628 may decompose a channel matrix for each subcarrier or each group of subcarriers of interest to obtain a corresponding beamforming matrix. Processor 2628 may also derive a spatial filter matrix for each subcarrier or each group of subcarriers of interest. Processor 2628 may provide the spatial filter matrices to RX spatial processor 2640 for spatial matched filtering and may provide the channel matrices or beamforming matrices to controller/processor 2630 for feedback to station B.

Controllers/processors 2630 and 2680 may control the operation at stations A and B, respectively. Memories 2632 and 2682 may store data and program codes for stations A and B, respectively. Processors 2628, 2630, 2678, 2680 and/or other processors may perform the processes and functions described herein, e.g., process 1400 in FIG. 14, process 1600 in FIG. 16, process 1800 in FIG. 18, process 2000 in FIG. 20, process 2200 in FIG. 22, process 2400 in FIG. 24, etc.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 2632 or 2682 in FIG. 26) and executed by a processor (e.g., processor 2630 or 2680). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus comprising:
   at least one processor configured to receive a training request, to send a first sounding frame in response to the training request, to receive a request for explicit feedback for beamforming and an announcement that a Null Data Packet (NDP) will follow, to receive a second sounding frame comprising the NDP, to generate the explicit feedback based on the second sounding frame, and to send the explicit feedback in response to the request for explicit feedback; and
   a memory coupled to the at least one processor.

2. The apparatus of claim 1, wherein the at least one processor is configured to receive a steered frame sent based on the explicit feedback.

3. The apparatus of claim 1, wherein the at least one processor is configured to receive a steered frame sent based on implicit feedback derived from the first sounding frame.

4. The apparatus of claim 1, wherein the at least one processor is configured to receive explicit feedback derived based on the first sounding frame, to derive steering information based on the received explicit feedback, and to send a steered frame based on the steering information.

5. The apparatus of claim 1, wherein the at least one processor is configured to receive a third sounding frame, to derive steering information based on the third sounding frame, and to send a steered frame based on the steering information.

6. The apparatus of claim 1, wherein the first sounding frame comprises training and data fields.

7. The apparatus of claim 1, wherein the first and second sounding frames each comprise an NDP having at least one training field but no data field.

8. The apparatus of claim 1, wherein the first and second sounding frames each comprise a frame having training and data fields or an NDP having at least one training field but no data field.

9. The apparatus of claim 1, wherein the explicit feedback comprises channel state information (CSI) matrices, non-compressed beamforming feedback matrices, or compressed beamforming feedback matrices.

10. The apparatus of claim 1, wherein the first and second sounding frames comprise Physical Layer Convergence Protocol (PLCP) protocol data units (PPDUs) in IEEE 802.11.

11. A method for wireless communication comprising:
receiving, at an apparatus, a training request;
sending a first sounding frame in response to the training request;
receiving a request for explicit feedback for beamforming and an announcement that a Null Data Packet (NDP) will follow;
receiving a second sounding frame comprising the NDP;
generating the explicit feedback based on the second sounding frame; and
sending, by the apparatus, the explicit feedback in response to the request for explicit feedback.

12. The method of claim 11, further comprising:
receiving a steered frame sent based on either the explicit feedback or implicit feedback derived from the first sounding frame.

13. The method of claim 11, further comprising:
receiving explicit feedback derived based on the first sounding frame;
deriving steering information based on the received explicit feedback; and
sending a steered frame based on the steering information.

14. The method of claim 11, further comprising:
receiving a third sounding frame;
deriving steering information based on the third sounding frame; and
sending a steered frame based on the steering information.

15. An apparatus comprising:
means for receiving a training request;
means for sending a first sounding frame in response to the training request;
means for receiving a request for explicit feedback for beamforming and an announcement that a Null Data Packet (NDP) will follow;
means for receiving a second sounding frame comprising the NDP;
means for generating the explicit feedback based on the second sounding frame; and
means for sending the explicit feedback in response to the request for explicit feedback.

16. The apparatus of claim 15, further comprising: means for receiving a steered frame sent based on either the explicit feedback or implicit feedback derived from the first sounding frame.

17. The apparatus of claim 15, further comprising:
means for receiving explicit feedback derived based on the first sounding frame;
means for deriving steering information based on the received explicit feedback; and
means for sending a steered frame based on the steering information.

18. The apparatus of claim 15, further comprising:
means for receiving a third sounding frame;
means for deriving steering information based on the third sounding frame; and
means for sending a steered frame based on the steering information.

19. A non-transitory processor-readable medium including instructions stored thereon, comprising:
a first instruction set for receiving, at an apparatus, a training request;
a second instruction set for sending a first sounding frame in response to the training request;
a third instruction set for receiving a request for explicit feedback for beamforming and an announcement that a Null Data Packet (NDP) will follow;
a fourth instruction set for receiving a second sounding frame comprising the NDP;
a fifth instruction set for generating the explicit feedback based on the second sounding frame; and
a sixth instruction set for sending, to the apparatus, the explicit feedback in response to the request for explicit feedback.

20. An apparatus comprising:
at least one processor configured to send a first frame with a request for explicit feedback, to send a Null Data Packet (NDP) having at least one training field but no data field, to receive a second frame with the explicit feedback derived based on the NDP, to send a third frame with a reverse direction grant within a short interframe space (SIFS) time of the NDP, and to receive the second frame after the third frame,
wherein the at least one processor is further configured to include, in the first frame or the third frame, an announcement that the NDP will follow; and
a memory coupled to the at least one processor.

21. The apparatus of claim 20, wherein the at least one processor is configured to derive steering information based on the explicit feedback and to send a steered frame based on the steering information.

22. The apparatus of claim 20, wherein the first frame comprises a Request to Send (RTS) frame, and wherein the at least one processor is configured to receive a Clear to Send (CTS) frame and to send the NDP within a short interframe space (SIFS) time of the CTS frame.

23. A method for wireless communication comprising:
sending a first frame with a request for explicit feedback;
sending a Null Data Packet (NDP) having at least one training field but no data field;
receiving a second frame with the explicit feedback derived based on the NDP; and
sending a third frame with a reverse direction grant within a short interframe space (SIFS) time of the NDP, wherein the second frame is received after the third frame; and further comprising:
including, in the first frame or the third frame, an announcement that the NDP will follow.

24. The method of claim 23, further comprising:
deriving steering information based on the explicit feedback; and
sending a steered frame based on the steering information.

25. The method of claim 23, further comprising:
receiving a Clear to Send (CTS) frame in response to a Request to Send (RTS) frame sent as the first frame, and wherein the NDP is sent within a short interframe space (SIFS) time of the CTS frame.

26. An apparatus comprising:
   at least one processor configured to receive a Null Data Packet (NDP) having at least one training field but no data field, to derive steering information based on the NDP, to send a steered frame based on the steering information, to send a reverse direction grant in a first frame, to receive a second frame after the first frame, wherein the second frame includes an announcement that the NDP will follow, and to receive the NDP after the second frame; and
   a memory coupled to the at least one processor.

27. The apparatus of claim 26, wherein the at least one processor is configured to send the first frame with a training request and to receive the NDP in response to the training request.

28. The apparatus of claim 26, wherein the second frame includes an indication that another frame will follow, and wherein the at least one processor is configured to receive a third frame after the second frame, the third frame including an indication that no other frame will follow.

29. The apparatus of claim 26, wherein the at least one processor is configured to send a Request to Send (RTS) frame, to receive a Clear to Send (CTS) frame in response to the RTS frame, and to send the first frame after the CTS frame.

30. A method for wireless communication comprising:
   receiving a Null Data Packet (NDP) having at least one training field but no data field;
   deriving steering information based on the NDP;
   sending a steered frame based on the steering information;
   sending a reverse direction grant in the first frame; and
   receiving a second frame after the first frame, wherein the second frame includes an announcement that the NDP will follow, and wherein the NDP is received after the second frame.

31. The method of claim 30, further comprising:
   sending the first frame with a training request, and wherein the NDP is received in response to the training request.

32. An apparatus comprising:
   at least one processor configured to send a first frame with a training request and an announcement that a first Null Data Packet (NDP) will follow, to send the first NDP having at least one training field but no data field, and to receive a second NDP in response to the training request, wherein the at least one processor is configured to derive steering information based on the second NDP and to send a steered frame based on the steering information; and
   a memory coupled to the at least one processor.

33. The apparatus of claim 32, wherein the at least one processor is configured to receive a steered frame based on steering information derived from the first NDP.

34. The apparatus of claim 32, wherein the at least one processor is configured to send a Request to Send (RTS) frame, to receive a Clear to Send (CTS) frame in response to the RTS frame, and to send the first frame after the CTS frame.

35. A method for wireless communication comprising:
   sending a first frame with a training request and an announcement that a first Null Data Packet (NDP) will follow;
   sending the first NDP having at least one training field but no data field;
   receiving a second NDP in response to the training request;
   deriving, at an apparatus, steering information based on the second NDP; and
   sending, by the apparatus, a steered frame based on the steering information.

36. The method of claim 35, further comprising:
   receiving a steered frame based on steering information derived from the first NDP.

37. An apparatus comprising:
   at least one processor configured to send a first frame with a request for explicit feedback for calibration, wherein the first frame includes a training request and an announcement that a Null Data Packet (NDP) will follow, to send the NDP having at least one training field but no data field, to receive a second frame with the explicit feedback to receive a sounding frame, wherein the sounding frame is sent in response to the training request, to derive a channel estimate based on the sounding frame, and to perform calibration based on the channel estimate and the explicit feedback; and
   a memory coupled to the at least one processor.

38. The apparatus of claim 37, wherein the sounding frame comprises an NDP.

39. The apparatus of claim 37, wherein the sounding frame comprises training and data fields.

40. The apparatus of claim 37, wherein the at least one processor is configured to send a third frame with a training request after the NDP, and wherein the sounding frame is sent in response to the training request.

41. A method for wireless communication comprising:
   sending a first frame with a request for explicit feedback for calibration, wherein the first frame includes a training request and an announcement that a Null Data Packet (NDP) will follow;
   sending the NDP having at least one training field but no data field;
   receiving a second frame, at an apparatus, with the explicit feedback;
   receiving a sounding frame, wherein the sounding frame is sent in response to the training request;
   deriving a channel estimate, at the apparatus, based on the sounding frame; and
   performing calibration based on the channel estimate and the explicit feedback.

42. The method of claim 41, further comprising:
   sending a third frame with a training request after the NDP, and wherein the sounding frame is sent in response to the training request.

43. A non-transitory computer-readable medium having instructions stored thereon, comprising:
   instructions for receiving, at an apparatus, a training request;
   instructions for sending a first sounding frame in response to the training request;
   instructions for receiving a request for explicit feedback for beamforming and an announcement that a Null Data Packet (NDP) will follow;
   instructions for receiving a second sounding frame comprising the NDP;
   instructions for generating the explicit feedback based on the second sounding frame; and
   instructions for sending, by the apparatus, the explicit feedback in response to the request for explicit feedback.

44. A non-transitory computer-readable medium having instructions stored thereon, comprising:
   instructions for sending a first frame with a request for explicit feedback;
   instructions for sending a Null Data Packet (NDP) having at least one training field but no data field;

instructions for receiving a second frame with the explicit feedback derived based on the NDP; and instructions for sending a third frame with a reverse direction grant within a short interframe space (SIFS) time of the NDP, wherein the instructions further comprise instructions for including, in the first frame or the third frame, an announcement that the NDP will follow.

45. The non-transitory computer-readable medium of claim 44, further comprising: instructions for deriving steering information based on the explicit feedback; and instructions for sending a steered frame based on the steering information.

46. A non-transitory computer-readable medium having instructions stored thereon, comprising:

instructions for receiving a Null Data Packet (NDP) having at least one training field but no data field;

instructions for deriving steering information based on the NDP;

instructions for sending a steered frame based on the steering information;

instructions for sending a reverse direction grant in a first frame; and instructions for receiving a second frame after the first frame, wherein the second frame includes an announcement that the NDP will follow, and wherein the NDP is received after the second frame.

47. The non-transitory computer-readable medium of claim 46, further comprising: instructions for sending a first frame with a training request, and wherein the NDP is received in response to the training request.

48. A non-transitory computer-readable medium having instructions stored thereon, comprising:

instructions for sending a first frame with a training request and an announcement that a first Null Data Packet (NDP) will follow;

instructions for sending the first NDP having at least one training field but no data field;

instructions for receiving a second NDP in response to the training request;

instructions for deriving, at an apparatus, steering information based on the second NDP; and instructions for sending, by the apparatus, a steered frame based on the derived steering information.

49. The non-transitory computer-readable medium of claim 48, further comprising: instructions for receiving a steered frame based on steering information derived from the first NDP.

50. A non-transitory computer-readable medium having instructions stored thereon, comprising:

instructions for sending a first frame with a request for explicit feedback for calibration, wherein the first frame includes a training request and an announcement that a Null Data Packet (NDP) will follow;

instructions for sending the NDP having at least one training field but no data field;

instructions for receiving, at an apparatus, a second frame with the explicit feedback;

instructions for receiving a sounding frame, wherein the sounding frame is sent in response tot eh training request;

instructions for deriving, at the apparatus, a channel estimate based on the sounding frame; and instructions for performing calibration based on the channel estimate and the explicit feedback.

* * * * *